US012243686B2

United States Patent
Shuaibu et al.

(10) Patent No.: US 12,243,686 B2
(45) Date of Patent: Mar. 4, 2025

(54) DATE STONE ACTIVATED CARBON SUPERCAPACITOR

(71) Applicant: KING FAHD UNIVERSITY OF PETROLEUM AND MINERALS, Dhahran (SA)

(72) Inventors: Abubakar Dahiru Shuaibu, Dhahran (SA); Atif Saeed Alzahrani, Dhahran (SA); Md. Abdul Aziz, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 116 days.

(21) Appl. No.: 18/332,048

(22) Filed: Jun. 9, 2023

(65) Prior Publication Data
US 2024/0412928 A1    Dec. 12, 2024

(51) Int. Cl.
*H01G 11/44*    (2013.01)
*H01G 11/24*    (2013.01)
(Continued)

(52) U.S. Cl.
CPC ............ *H01G 11/44* (2013.01); *H01G 11/24* (2013.01); *H01G 11/34* (2013.01); *H01G 11/36* (2013.01); *H01G 11/56* (2013.01); *H01G 11/86* (2013.01)

(58) Field of Classification Search
None
See application file for complete search history.

(56) References Cited

U.S. PATENT DOCUMENTS

2013/0004408 A1    1/2013    Dua et al.
2020/0075268 A1    3/2020    Ahamad et al.

FOREIGN PATENT DOCUMENTS

| CN | 105645408 A | 6/2016 | |
| CN | 109081342 A | * 12/2018 | ........... C01B 32/324 |
| IN | 201941042994 A | 4/2021 | |

OTHER PUBLICATIONS

Rakhmawati Farma, et al., "Hierarchical-nanofiber structure of biomass-derived carbon framework with direct $CO_2$ activation for symmetrical supercapacitor electrodes", Journal of Materials Science: Materials in Electronics, vol. 34, Article No. 81, Jan. 12, 2023, 18 pages (Abstract only).

(Continued)

*Primary Examiner* — Eric W Thomas
(74) *Attorney, Agent, or Firm* — Oblon, McClelland, Maier & Neustadt, L.L.P.

(57) ABSTRACT

A supercapacitor including a gel electrolyte and two electrodes having a substrate, date stone activated carbon, a conductive carbon compound different from the date stone activated carbon, and a binding compound. A mixture of the date stone activated carbon, the conductive carbon compound, and the binding compound partially coats a surface of the substrate. The two electrodes are assembled in a symmetrical layered configuration with the surfaces coated with the mixture facing each other. The gel electrolyte is present between the surfaces coated with the mixture to form the supercapacitor. The gel electrolyte is a mixture of $H_2SO_4$, polyvinyl alcohol, and anthraquinone. Particles of the date stone activated carbon have a nanosheet morphology, and the nanosheets are stacked on top of each other to form a hierarchical structure.

20 Claims, 16 Drawing Sheets

(51) Int. Cl.
*H01G 11/34* (2013.01)
*H01G 11/36* (2013.01)
*H01G 11/56* (2013.01)
*H01G 11/86* (2013.01)

(56) References Cited

OTHER PUBLICATIONS

Rekha Goswami Shrestha, et al., "Hierarchically Porous Carbon from *Phoenix dactylifera* Seed for High-Performance Supercapacitor Applications", Bulletin of the Chemical Society of Japan, vol. 95, Issue 7, 2022, pp. 1060-1067 (Abstract only).

Prashant Dubey, et al., "Effect of nitrogen and sulphur co-doping on the surface and diffusion characteristics of date seed-derived porous carbon for asymmetric supercapacitors", Journal of Energy Storage, vol. 58, Feb. 2023, 7 pages (Abstract only).

* cited by examiner

DATE STONE ACTIVATED CARBON SUPERCAPACITOR

STATEMENT OF PRIOR DISCLOSURE BY INVENTOR

Aspects of the present disclosure are described in Dahiru Shuaibu, A., Saeed Alzahrani, A., and Aziz, M. A., "High-performance Supercapacitors Enabled by Highly-porous Date Stone-derived Activated Carbon and Organic Redox Gel Electrolyte"; Asian J. Org. Chem.; Mar. 14, 2023, incorporated herein by reference in its entirety.

STATEMENT OF ACKNOWLEDGEMENT

Support provided by the Interdisciplinary Research Center for Hydrogen and Energy Storage (IRC-HES) at King Fahd University of Petroleum and Minerals (KFUPM) under grant number INHE2105 is gratefully acknowledged.

BACKGROUND

Technical Field

The present disclosure is directed to a supercapacitor, specifically a supercapacitor including date stone activated carbon.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Supercapacitors (SC) are associated with low specific energy problems. However, when compared to rechargeable batteries, their rapid charging and discharging cycles are improved, which allows them to store an adequate amount of energy in a short amount of time. The components of the electrodes affect the intrinsic efficiency of the SC. Also, the electrolyte is another important component of an energy storage system. An ideal electrolyte should be environmentally friendly, have good thermal and electrochemical stability, low toxicity, high ionic conductivity, a broad operating voltage window, and low volatility and flammability.

Activated carbon derived from biowastes has the potential for use as a high-performance electrode material for energy storage devices. However, the activation process may release unwanted gases, such as $SO_2$ and $NO_2$, therefore the emissions should be controlled to avoid higher manufacturing costs. The use of biowastes in the fabrication of electrochemical supercapacitors aids in waste disposal while also serving as an economic platform for sustainable energy storage technologies. Date seeds, like other biowastes, have been used to make activated carbon, but there has been little research and information on the potential of date seeds for energy storage applications. Hence, there remains a need for a cost-effective and high-performing supercapacitor made with a biowaste material.

Accordingly, it is an object of the present disclosure to prepare a date stone-derived activated carbon for fabricating a supercapacitor with high energy density, power density, capacitance, and stability.

SUMMARY

In an exemplary embodiment, a supercapacitor is described. The supercapacitor includes a gel electrolyte and two electrodes. The electrodes include a substrate, date stone activated carbon, a conductive carbon compound different from the date stone activated carbon, and a binding compound. A mixture of the date stone activated carbon, the conductive carbon compound, and the binding compound at least partially coats a surface of the substrate. The two electrodes are assembled in a symmetrical layered configuration with the surfaces coated with the mixture facing each other. The gel electrolyte is present between the surfaces coated with the mixture to form the supercapacitor. The gel electrolyte is a mixture of $H_2SO_4$, polyvinyl alcohol, and anthraquinone. Particles of the date stone activated carbon have a nanosheet morphology, and the nanosheets are stacked on top of each other to form a hierarchical structure.

In some embodiments, the date stone activated carbon is at least 70% graphitic.

In some embodiments, the nanosheets have a width of 100-500 nanometers (nm).

In some embodiments, the date stone activated carbon includes carbon, oxygen, potassium, and magnesium.

In some embodiments, the date stone activated carbon includes 80-95 wt. % carbon, 1-15 wt. % oxygen, 1-5 wt. % potassium, and 0.1-2 wt. % magnesium, based on a total weight of the date stone activated carbon.

In some embodiments, the date stone activated carbon has a BET surface area of 1500-1700 square meter per gram ($m^2/g$).

In some embodiments, the date stone activated carbon has a pore volume of 0.6-0.8 square centimeters per gram ($cm^2/g$).

In some embodiments, the date stone activated carbon has micropores, mesopores, and macropores.

In some embodiments, the mixture includes 65-85 wt. % of the date stone activated carbon, 5-25 wt. % of the conductive carbon compound, and 5-15 wt. % of the binding compound, based on a total weight of the mixture.

In some embodiments, the gel electrolyte includes 1-20 wt. % polyvinyl alcohol and 80-99 wt. % anthraquinone, based on a total weight of the polyvinyl alcohol and the anthraquinone in the gel electrolyte.

In some embodiments, the gel electrolyte has an equivalent series resistance of 0.3-0.7 ohms ($\Omega$).

In some embodiments, the substrate is made from at least one material selected from the group consisting of stainless steel, aluminum, nickel, copper, platinum, zinc, tungsten, and titanium.

In some embodiments, the conductive carbon compound is at least one selected from the group consisting of graphite, activated carbon, reduced graphene oxide, carbon nanotubes, carbon nanofibers, and carbon black.

In some embodiments, the binding compound is selected from the group consisting of polyvinylidene fluoride and N-methyl pyrrolidone.

In some embodiments, the supercapacitor has a specific capacitance of 120-150 farad per gram (F/g) at 0.5 amperes per gram (A/g).

In some embodiments, the supercapacitor has an energy density of 15-20 watt-hours per kilogram (Wh/Kg) at a power density of 250 watts per kilogram (W/Kg).

In some embodiments, the supercapacitor has a capacitance retention of at least 85% after 1000 charge-discharge cycles.

In some embodiments, a power bank is described. The power bank includes 2-10 of the supercapacitors connected in parallel and/or series.

In some embodiments, a wearable device having the supercapacitor is described. The supercapacitor is electrically connected to a sensor and the supercapacitor functions as a battery.

In some embodiments, the date stone activated carbon is produced by a method including cleaning and drying date stones to form dry date stones, pulverizing the dry date stones to form a powder, carbonizing the powder at a temperature of 300-500° C. for 1-10 hours under an inert atmosphere to form a carbon powder, mixing the carbon powder with a base to form a carbon solution, and carbonizing the carbon solution at a temperature of 700-1,000° C. for 1-10 hours under an inert atmosphere to form the date stone activated carbon.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
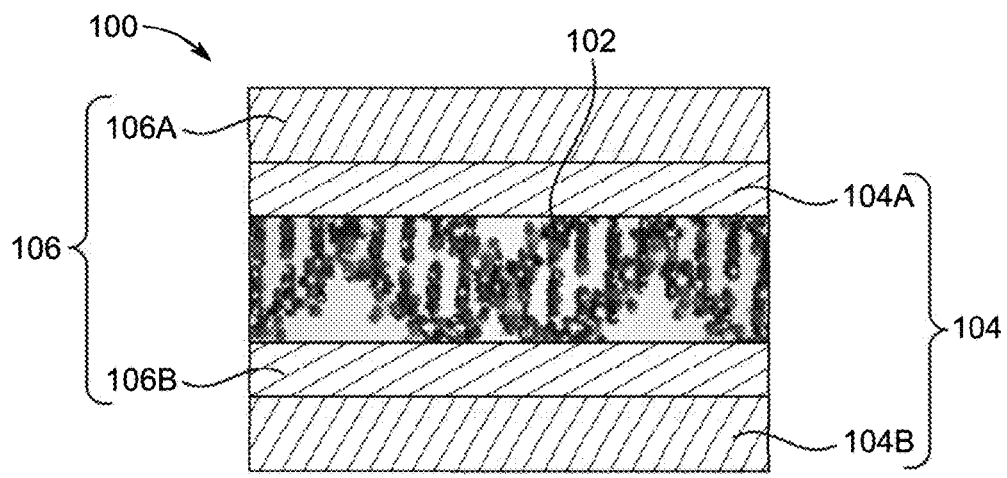
FIG. 1A is a schematic image of a symmetric supercapacitor (SSC), according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

Aspects of the present disclosure are directed towards a supercapacitor. The supercapacitor includes date seed biowaste as an activated carbon source because of its natural abundance, cost-effectiveness, and sustainability. A symmetric supercapacitor (SSC) including the date seed activated carbon with a gel electrolyte as a redox additive is assembled and provides a high energy density, capacitance, and stability.

Referring to FIG. 1A, a schematic image of a symmetric supercapacitor (SSC) 100 is illustrated, according to an embodiment of the present disclosure. The symmetric supercapacitor 100 is alternatively referred to as 'the supercapacitor 100' for the illustration purpose of the present disclosure.

According to the present disclosure, the supercapacitor 100 includes a gel electrolyte 102 and two electrodes, namely a first electrode 104A and a second electrode 104B. The first electrode 104A and the second electrode 104B are collectively referred to as 'the electrodes 104' or 'the electrodes' and individually referred to as 'the electrode 104' or 'the electrode' unless otherwise specifically mentioned. The two electrodes 104 are otherwise known as anode and cathode. The two electrodes are the same (symmetric supercapacitor) or different (asymmetric supercapacitor). The electrodes include a first substrate 106A connected to the first electrode 104B and a second substrate 106B connected to the second electrode 104B. The first substrate, 106A, and the second substrate, 106B, are collectively referred to as 'the substrates 106' and individually referred to as 'the substrate 104' unless otherwise specifically mentioned. The substrate 106 is used to conduct and bridge the flow of electrons between the active material and the external battery terminals. The gel electrolyte 102 is disposed between the first electrode 104A and the second electrode 104B.

To form the electrodes, a surface of the substrate is at least partially coated with a mixture of date stone activated carbon, a conductive carbon compound, and a binding compound. In an embodiment, the substrate surface is 50% coated with the mixture, preferably 60%, 70%, 80%, 90%, or 100% coated. In a preferred embodiment, the supercapacitor is a symmetric supercapacitor (SSC). In this arrangement, the two electrodes 104 are assembled in a symmetrical layered configuration with the surfaces coated with the mixture facing each other. In an embodiment, the substrate is made from at least one material selected from the group consisting of stainless steel, aluminum, nickel, copper, platinum, zinc, tungsten, and titanium. In a preferred embodiment, the substrate is stainless steel.

The conductive carbon compound is at least one selected from the group consisting of graphite, activated carbon, reduced graphene oxide, carbon nanotubes, carbon nanofibers, and carbon black. The conductive carbon compound is different from the date stone activated carbon.

In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is at least one selected from the group consisting of polyvinylidene fluoride and N-methyl pyrrolidone. In an embodiment, the binding compound is a combination of N-methyl pyrrolidone and PVDF.

Biochar is a lightweight black residue, made of carbon and ashes, remaining after the pyrolysis of biomass. Biochar is made by heating biomass up to 1,200° C. in an oxygen-limited environment. In some embodiments, the biochar can also be produced with raw materials such as grass, cow manure, wood chips, rice husk, wheat straw, and other agricultural residues. Furthermore, the biochar can be produced from residual biomasses such as crop residues, manure, wood residues, and forests and green wastes using modern pyrolysis technology. Agricultural wastes (bark, straw, husks, seeds, peels, bagasse, sawdust, nutshells, wood shavings, animal beds, and corn stalks, etc.), industrial wastes (bagasse, distillers' grain, etc.), and urban and municipal wastes can also be used for the fabrication of the biochar. In a preferred embodiment, the biochar of the present disclosure is made from date stones, also referred to as date stone activated carbon.

Generally, dates (*Phoenix dactylifera*) are cultivated in the tropical region as a flowering plant that belongs to the palm family, Aceraceae, and is well known for their sweet edible fruit. Date seeds are favorable for synthesizing nano carbons and activated carbons owing to the structural organization, high lignocellulosic nature, and low ash content. Their composition is about 42% cellulose, 18% hemicellulose, 25% sugar and other compounds, 11% lignin, and 42% ash. Date stones or seeds account for 11-18% of the weight of the date fruit. The date manufacturing industry produces a large amount of date seeds, but only a small portion of those seeds are used as cattle feed, with the majority being discarded as waste.

Figure 1B:
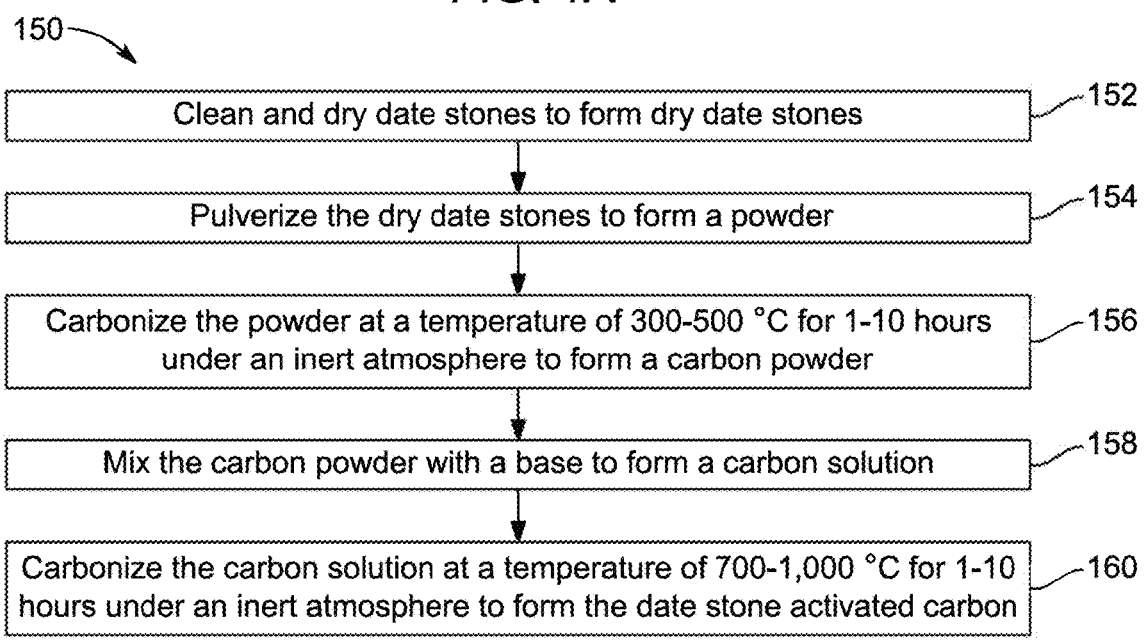
FIG. 1B is a flowchart depicting a method of making a date stone activated carbon (DSAC), according to certain embodiments.

Referring to FIG. 1B, a schematic flowchart of a method 150 of preparing the date stone activated carbon is illustrated, according to an embodiment of the present disclosure. The order in which the method 150 is described is not intended to be construed as a limitation, and any number of the described method steps can be combined in any order to implement the method 150. Additionally, individual steps may be removed or skipped from the method 150 without departing from the spirit and scope of the present disclosure.

At step 152, the method 150 includes cleaning and drying date stones to form dry date stones. Date stones from commercially procured dates were thoroughly cleaned with distilled water to remove any contaminants. The washed dates were further dried in an oven at 90 to 140° C., preferably 95 to 130° C., 100 to 120° C., or about 105 to 110° C., to reduce the moisture content to below 5 wt. %, preferably below 4 wt. %, below 3 wt. %, below 2 wt. %, or below 1 wt. %. The date stones may be dried for any amount of time that provides an adequately dried product, typically, for drying times of 12 to 48 hours, preferably 16 to 36 hours, 20 to 30 hours, or about 24 hours.

At step 154, the method 150 includes pulverizing the dry date stones to form a powder. Pulverization may be carried out using any suitable means, for example, by grinding, ball milling, blending, etc., using manual methods (e.g., mortar) or machine-assisted methods such as using a mechanical blender, or any other apparatus known to those of ordinary skill in the art.

Figure 3:
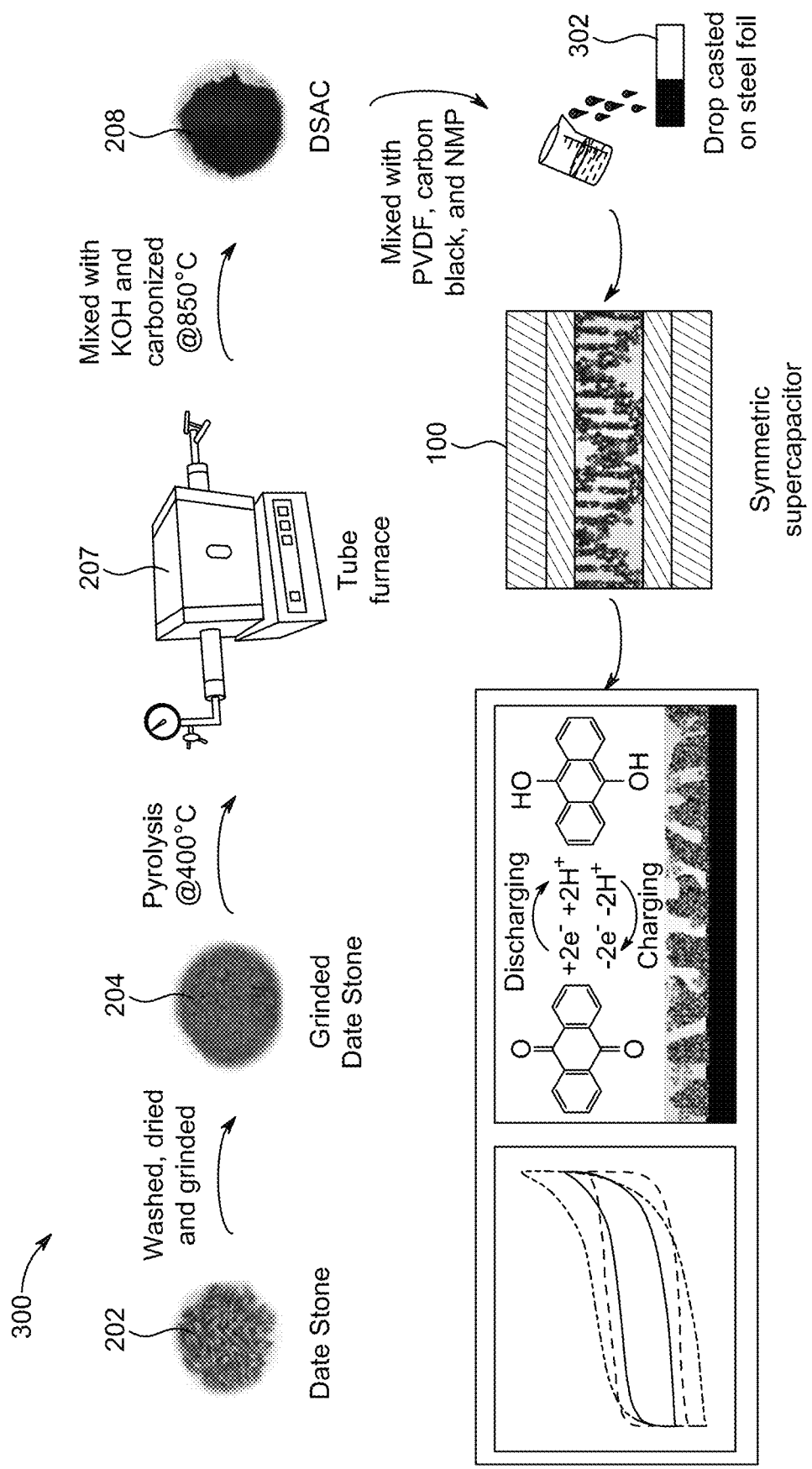
FIG. 3 is a schematic pictorial representation of a method of fabricating the SSC, according to certain embodiments.

At step 156, the method 150 includes carbonizing the powder at a temperature of 300-500° C., preferably 350-450° C., or about 400° C. under an inert atmosphere to form a carbon powder. The inert atmosphere is preferably free of oxygen, and includes an inert gas such as argon or nitrogen. In an embodiment, the carbonization may be performed by placing the powder into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, up to 30° C./min, up to 20° C./min, or up to 10° C./min; and a cooling rate of 1 to 15° C./min, preferably 3 to 10° C./min, or 5 to 6° C./min to a temperature described above, for 1 to 15 hours, preferably 2 to 10 hours, 3 to 8 hours, 3 to 5 hours, or about 3 hours. In an embodiment, the powder is carbonized in a furnace (shown in FIG. 3) with a steady flow of nitrogen gas for three hours at 400° C.

At step 158, the method 150 includes mixing the carbon powder with a base to form a carbon solution. Suitable examples of bases include sodium hydroxide, potassium hydroxide, lithium hydroxide, sodium bicarbonate, potassium bicarbonate, cesium bicarbonate, magnesium bicarbonate, and calcium bicarbonate, and any other inorganic bases that may be known to a person skilled in the art. In a preferred embodiment, the base is KOH. In some embodiments, the carbon powder was thoroughly dissolved in a KOH solution that was constantly stirred. The ratio of the carbon powder to KOH ratio is in a range of 1:1 to 1:5, preferably 1:1 to 1:3, and more preferably 1:2. The resulting carbon solution was dried for 12-36 hours, preferably 20-24 hours, in an oven.

At step 160, the method 150 includes carbonizing the carbon solution at a temperature of 700-1,000° C., preferably 750-950° C., 800-900° C. or about 850° C. under an inert atmosphere to form the date stone activated carbon. The inert atmosphere is preferably free of oxygen, and includes an inert gas such as argon or nitrogen. In an embodiment, the carbonization may be performed by placing the carbon solution into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, up to 30° C./min, up to 20° C./min, or up to 10° C./min; and a cooling rate of 1 to 15° C./min, preferably 3 to 10° C./min, or 5 to 6° C./min to a temperature described above, for 1 to 15 hours, preferably 2 to 10 hours, 3 to 8 hours, 3 to 5 hours, or about 3 hours. In an embodiment, the powder is carbonized in a furnace with a steady flow of nitrogen gas for three hours at 850° C.

In some embodiments, the date stone activated carbon includes carbon, oxygen, potassium, and magnesium. In some embodiments, the date stone activated carbon includes 80-95 wt. %, preferably 85-90 wt. %, or about 87 wt. % carbon, 1-15 wt. % preferably 3-12 wt. %, or 5-10 wt. % oxygen, 1-5 wt. %, preferably 2-4 wt. %, or about 3 wt. % potassium, and 0.1-2 wt. %, preferably 0.5-1.5 wt. %, or about 1 wt. % magnesium, based on the total weight of the date stone activated carbon.

In some embodiments, the date stone activated carbon is amorphous. In some embodiments, the date stone activated carbon has a graphitic structure. In some embodiments, the date stone activated carbon is both amorphous and graphitic. Amorphous refers to a structure with defects in the carbon structure that prevent the formation of a crystalline graphitic structure. In a preferred embodiment, at least 50% of date stone activated carbon is graphitic, preferably 60%, 70%, 80%, 90%, or it is entirely graphitic.

In some embodiments, the date stone activated carbon particles of the date stone activated carbon have a nanosheet morphology. In some embodiments, the nanosheets have a width of 100-500 nm, preferably 150-450 nm, 200-400 nm, 250-350 nm, or about 300 nm. In some embodiments, the nanosheets have a rounded end. In some embodiments, the nanosheets are stacked on top of each other to form a hierarchical structure. In some embodiments, the nanosheets are not stacked directly on top of one another. In some embodiments, the nanosheets are be stacked where the sheets are offset in at least one dimension. For example, the stacking may resemble stairs where a top sheet is offset in a length of the nanosheet creating a step like structure, where the step like structure can continue for as many layers are in the date stone activated carbon particles. In some embodiments, the offset length is 10-200 nm, preferably 50-150 nm, or about 100 nm in the step like structure. Another possibility is that an individual nanosheet may have 2-5 nanosheets below it, preferably 2-3. For example, if the nanosheets are not directly on top of one another it may be one half of top of a first sheet and one half on top of a second sheet, creating a pyramid like structure. In a preferred embodiment, the nanosheets in the date stone activated carbon particles are stacked in a way that they are offset in two dimensions (not including the vertical stacking dimension), creating a stepped pyramid hierarchical structure.

In some embodiments, the date stone activated carbon has a BET surface area of 1500-1700 $m^2/g$, preferably 1550-1650 $m^2/g$, or about 1600 $m^2/g$. In some embodiments, the date stone activated carbon has a pore volume of 0.6-0.8 $cm^2/g$, preferably 0.65-0.75 $cm^2/g$, or about 0.70 $cm^2/g$. In some embodiments, the date stone activated carbon has micropores, mesopores, and macropores. The micropores have dimensions of less than 2 nm, preferably 0.01-2 nm, 0.1-1.5 nm, or about 1 nm, the mesopores have dimensions of 2-50 nm, preferably 10-40 nm, or 20-30 nm, and the macropores have dimensions of greater than 50 nm, preferably 50-1,000 nm, 100-900 nm, 200-800 nm, 300-700 nm, 400-600 nm, or about 500 nm.

In some embodiments, the mixture includes 65-85 wt. %, preferably 70-80 wt. %, or about 75 wt. % of the date stone activated carbon, 5-25 wt. %, preferably 10-20 wt. % or about 15 wt. % of the conductive carbon compound, and 5-15 wt. %, preferably about 7-12 wt. % or about 10 wt. % of the binding compound, based on the total weight of the mixture. The deposition of the mixture on the substrate (preferably stainless-steel mesh) can be done by methods known in the art—for example, drop casting, spin coating, etc.

The gel electrolyte 102 is present between the surfaces coated with the mixture to form the supercapacitor 100. Gel electrolytes can include a polymer matrix and a liquid component and integrate the advantages of both liquid and solid electrolytes. The liquid component plays a role in increasing the ionic conductivity and interfacial stability, and the polymer matrix provides adequate mechanical strength and shape flexibility. In a preferred embodiment, the gel electrolyte further includes a redox additive. The redox additive may be any compound preferably a quinone compound such as but not limited to anthraquinone, 1,4-benzoquinone, cyclohexadienedione, 1,2-benzoquinone, 1,4-naphthoquinone, 2,3-dichloro-5,6-dicyano-1,4-benzoquinone, and derivatives thereof. In some embodiments, the gel electrolyte is a mixture of $H_2SO_4$, polyvinyl alcohol, and anthraquinone.

In some embodiments, the gel electrolyte includes 1-20 wt. %, preferably 5-15 wt. %, or about 10 wt. % polyvinyl alcohol and 80-99 wt. %, preferably 85-95 wt. %, or about 80 wt. % anthraquinone, based on a total weight of the polyvinyl alcohol and the anthraquinone in the gel electrolyte. In some embodiments, the $H_2SO_4$ has a molarity of 0.1-10 M, preferably 0.5-5 M or 1-2 M. In some embodiments, the polyvinyl alcohol is present in the electrolyte in an amount of 0.001-0.1 g/mL, preferably 0.005-0.05 g/mL, or about 0.01 g/mL, based on a total amount of the electrolyte. In some embodiments, the anthraquinone is present in the electrolyte in an amount of 0.0001-0.01 g/mL, preferably 0.0005-0.005 g/mL, or about 0.001 g/mL, based on a total amount of the electrolyte. In some embodiments, the gel electrolyte has an equivalent series resistance of 0.3-0.7 ohms (Ω), preferably 0.4-0.6Ω, or about 0.5Ω.

In some embodiments, the supercapacitor 100 has a specific capacitance of 120-150 F/g, preferably 130-140 F/g or about 135 F/g at 0.5 A/g. In some embodiments, the supercapacitor 100 has an energy density of 15-20 Wh/kg, preferably 16-19 Wh/kg, or 17-18 Wh/kg at a power density of 250 W/kg. In some embodiments, the supercapacitor 100 has a capacitance retention of at least 85%, preferably 90%, 95%, or 100% after 1000 charge-discharge cycles.

Figure 7:
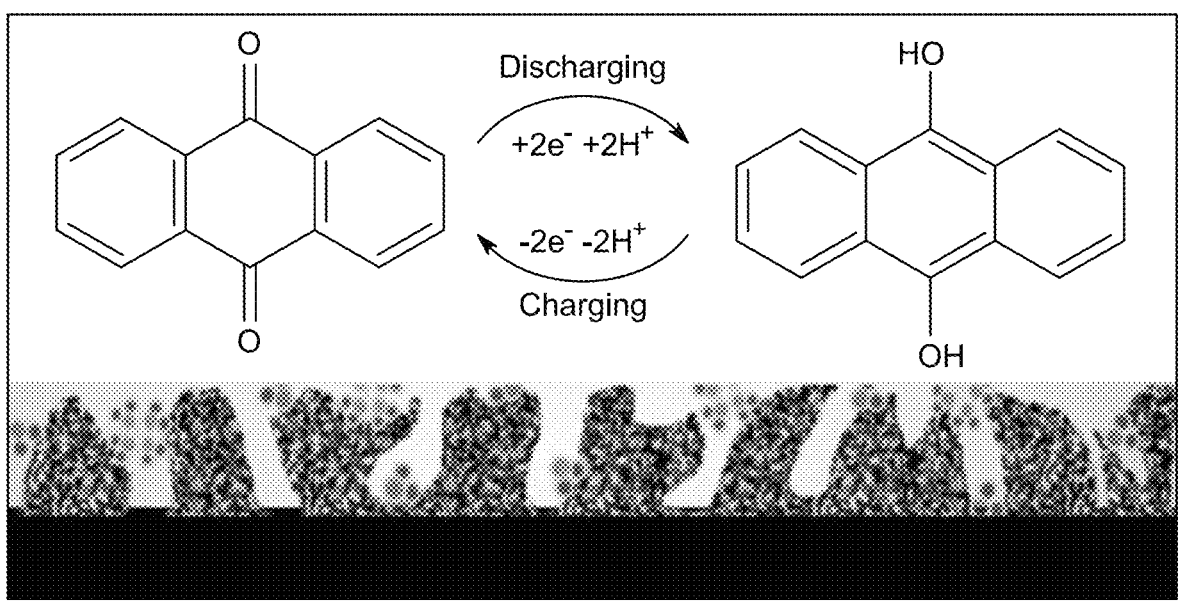
FIG. 7 is a schematic image showing redox nature of anthraquinone (AQ), according to certain embodiments.

While not wishing to be bound to a single theory, it is thought that the synergistic combination of the different sized pores of the date stone activated carbon, along with the redox active gel electrolyte, results in the high performing supercapacitor. The macro and meso pores enhance the transport of electrolyte ions through the carbon matrix of the date stone activated carbon, and the presence of micropores increase the surface area of the date stone activated carbon which provides additional sites for electrolyte ion adsorption. As a result, the synergistic combination of micropores, mesopores, and macropores in the date stone activated carbon offers a favorable balance of the surface area and ion transport properties that are well-suited for electrochemical energy storage applications. Further, the increased capacitance is attributed to the redox nature of the anthraquinone (i.e., anthraquinone/9,10-dihydroxyanthracene redox couple) as shown in FIG. 7. The redox additives in the gel electrolyte increase the charge storage capability via redox transformation.

In some embodiments, a plurality of the supercapacitors 100 may be connected in parallel and/or series to form a power bank, which may act as a power source for powering electrical devices. According to the present disclosure, 2-10, preferably 3-9, 4-8, or 5-7 of the supercapacitors 100 may be connected in parallel and/or series to form the power bank. The number of supercapacitors 100 in the power bank may be determined based on the intended use of the power bank for the specified electrical devices.

In some embodiments, the supercapacitor 100 may be attached to a wearable device and function as a battery to provide electric power to various components of the wearable device. Particularly, the supercapacitor 100 may be electrically connected to a sensor, thereby facilitating the sensor to detect various operating conditions or parameters of the wearable device. In an example, the wearable device may be a wristwatch. In some examples, the wearable device may be any device that may be deriving power from a power source such as a battery; as such, the supercapacitor 100 of the present disclosure may be implemented in the device to function as a battery.

EXAMPLES

The following examples describe and demonstrate exemplary embodiments of the supercapacitor described herein. The examples are provided solely for the purpose of illustration and are not to be construed as limitations of the present disclosure, as many variations thereof are possible without departing from the spirit and scope of the present disclosure.

Example 1: Materials

Date seed was obtained from a local source in Dhahran, Dammam, Eastern Province of KSA. Potassium hydroxide (KOH) pellets, $H_2SO_4$, polyvinyl alcohol (PVA), and anthraquinone were obtained from Sigma-Aldrich, while N-methylpyrrolidone (NMP) solvent, polyvinylidene fluoride (PVDF) binder, superconductive carbon, and stainless-steel foil were purchased from MTI corporation. High-purity nitrogen gas was used during the synthesis of the activated carbon.

Example 2: Preparation of Activated Carbon from Date Stones (DSAC)

Figure 2:
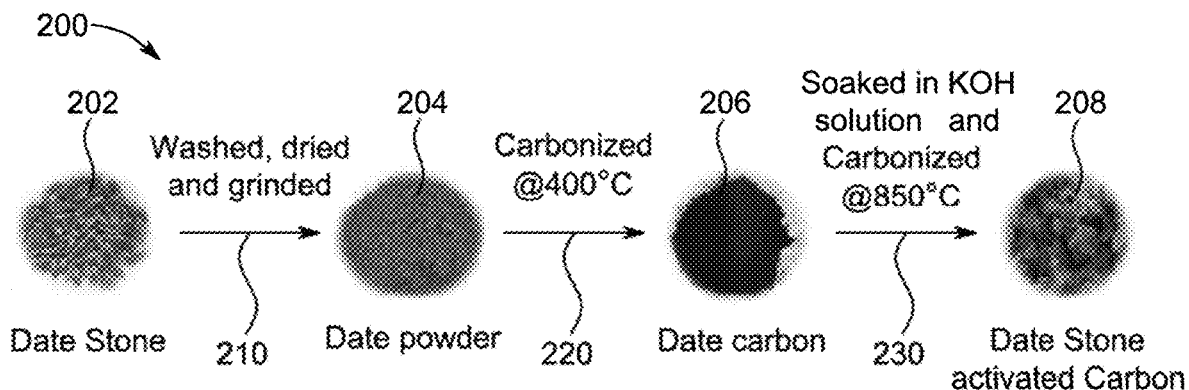
FIG. 2 is a schematic pictorial representation of a method of preparing the DSAC of the SSC, according to certain embodiments.

Referring to FIG. 2, a schematic pictorial representation of a method of preparing the DSAC of the SSC is illustrated. At step 210, the method 200 includes cleaning and drying date stones 202 to form dry date stones. Particularly, the date stones 202 were first thoroughly cleaned with distilled water multiple times to get rid of any contaminants, and the date stones 202 were then dried in an electric oven at 110° C. for 24 hours. The method 200 further includes pulverizing the dry date stones to form a powder 204. In an example, the dried date stones were reduced to the powder 204 with the use of a high-speed blender. At step 220, the method 200 includes carbonizing the powder 204 at a temperature of 300-500° C. for 1-10 hours under an inert atmosphere to form a carbon powder 206. In an embodiment, the powder 204 was carbonized in a furnace 207 (shown in FIG. 3) with a steady flow of nitrogen gas for three hours at 400° C. The carbonization was carried out at a heating and cooling rate of 10° C./min. and 5° C./min., respectively. At step 230, the method 200 includes mixing the carbon powder 206 with a base to form a carbon solution and carbonizing the carbon solution at a temperature of 700-1000° C. for 1-10 hours under an inert atmosphere to form the date stone activated carbon 208. In some embodiments, the carbon powder 208 was thoroughly dissolved in a KOH solution that was constantly stirred. The carbon and KOH ratio utilized was 1:2. The resulting carbon solution was dried for a full day in an oven before being carbonized for three hours at 850° C. at a heating and cooling rate of 10° C./min. and 5° C./min., respectively, under continuous nitrogen flow. The resulting activated carbon was then rinsed several times with 0.5MHCl and then with hot deionized water to remove any residual KOH.

Example 3: Characterization Techniques

The crystal structure and lattice characteristics of the date stone activated carbon were investigated using an X-ray diffractometer (XRD, Rigaku Miniflex-II diffractometer; manufactured by Rigaku, 3 Chome-9-12 Matsubaracho, Akishima, Tokyo 196-8666, Japan) and Cu—K-ray radiation at room temperature. The vibrational modes of the C—C bond stretching of the DSAC were examined using Raman spectroscopy. A HORIBA iHR320 spectrometer outfitted with a charge-coupled device detector and a 300 mW green light was used for the Raman analysis (manufactured by Horiba, Kyoto, 2 Miyanohigashi, Kisshoin, Minami-ku, Japan). The surface functional groups were determined using Fourier transform infrared (FT-IR) spectroscopy. The sample was made up of ca. 100 mg of KBr and 0.5 mg of carbon, which was then compacted into pellets using a digital hydraulic press. The surface morphology of DSAC was examined using field emission scanning electron microscopy (FE-SEM (JOEL, JSM6610LV; manufactured by JEOL, 3-1-2 Musashino, Akishima, Tokyo 196-8558)). Transmission electron microscopy (TEM) was used to examine the internal morphology and diffraction patterns of the DSAC (JOEL, JEM2100F). Grain lattice distortion and dispersion of grain boundaries were also investigated by TEM. Brunauer-Emmett-Teller (BET) was used to study the specific surface area, pore size distribution, and nitrogen adsorption/desorption isotherms. A Micromeritics ASAP 2020 surface area and porosity analyzer was used for the analysis (manufactured by Micrometrics Instrument Corporation, 4356 Communications Dr, Norcross, GA 30093, United States).

Example 4: Electrode Fabrication

Activated carbon, superconductive carbon, and PVDF binder were combined in a 75:15:10 ratio (w/w). The powder combination was ground in a mortar and pestle for 20 minutes to create a homogeneous mixture. To generate a thin slurry, the mixture was dissolved in the specified amount of NMP solvent and agitated at 90° C. for 4 hours. The slurry was then drop casted on stainless steel foil, as observed in FIG. 3 (302), such that at least a partial surface of the substrate is coated with the slurry, to form the electrode. The two electrodes 104 are assembled in a symmetrical layered configuration with the surfaces coated with the mixture facing each other. Further, the gel electrolyte 102 is present between the surfaces coated with the mixture to form the supercapacitor 100. In an example, each electrode 104 contains roughly 0.7 mg of the active substance such as the DSAC 208.

Example 5: Preparation of the Gel Electrolyte

The gel electrolyte 102 has an equivalent series resistance of 0.3-0.7Ω. In the present disclosure, the gel electrolyte 102 was made using the method provided in the study of [See: E. Feng, G. Ma, K. Sun, Q. Yang, H. Peng, Z. Lei, *RSC Adv.* 2016, 6, 75896-75904, incorporated herein by reference in its entirety]. Initially, 1 g of PVA was dissolved in 20 mL of a 1M $H_2SO_4$ solution and stirred continuously for three hours at 90° C. to produce a clear viscous solution. To create the redox gel electrolyte, 0.1 g of anthraquinone (AQ) was added to the aforementioned solution and stirred for an additional hour at the same temperature to form PVA-$H_2SO_4$-AQ. Finally, the redox gel electrolyte was cooled to room temperature before using supercapacitor fabrication. In comparison, PVA-$H_2SO_4$ without anthraquinone was produced using the same procedure.

Example 6: Electrochemical Measurement Technique

The SSC 100 of the present disclosure was characterized using cyclic voltammetry (CV), galvanostatic charge/discharge (GCD), and AC impedance (EIS). The EIS measurement was performed at a frequency of 1 to 1 MHz. An electrolyte-soaked filter paper was served as a separator and the date stone activated carbon 208 was served as the anode and cathode. Over a voltage window of 0 to 1.0 V, electrochemical measurements were conducted in a variety of electrolytes, including 1M $H_2SO_4$, PVA-$H_2SO_4$, and PVA-$H_2SO_4$-AQ. Different scan rates ranging from 10 to 200 mVs$^{-1}$ were used for the CV measurement. Different current densities ranging from 0.5 to 5 Ag$^{-1}$ were used for the GCD approach. The stability of the SSC 100 was tested in PVA-$H_2SO_4$-AQ for 1000 GCD cycles. The precise capacitance, energy, and power of the SSC 100 were calculated from the GCD results using the equations (1-3) below.

$$C_T(F/g) = \frac{I \times \Delta t}{m \times \Delta V} \quad (1)$$

Where, 1 is the applied current, $\Delta t$ is the discharge time, m is the mass of the active material on both the electrodes 104, and $\Delta V$ is the operating voltage window.

$$E(Wh/kg) = \frac{1}{2} \frac{CT \times \Delta V^2}{3.6} \quad (2)$$

$$P(W/kg) = \frac{E \times 3600}{t} \quad (3)$$

Where E is the specific energy (in Wh/kg), and P is the specific power (in W/kg).

Example 7: Structural Characterization

Figure 4A:
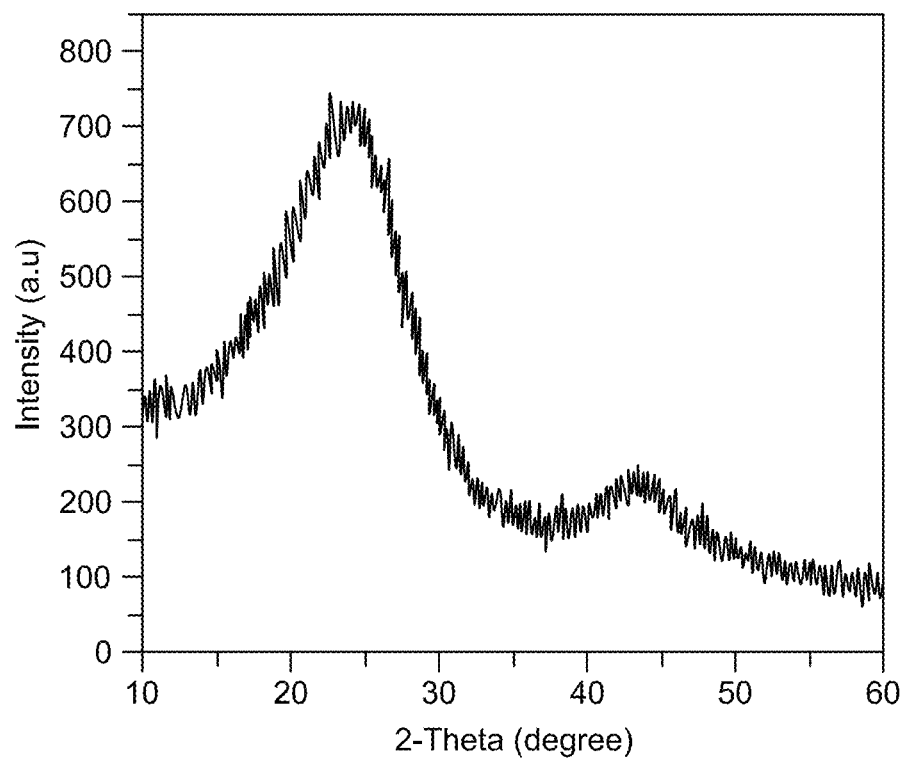
FIG. 4A is a plot depicting an X-Ray Diffraction (XRD) pattern of the DSAC, according to certain embodiments.

The X-ray diffraction (XRD) patterns of the DSAC 208 produced by carbonization in the tube furnace 207 at 400° C. in the inert atmosphere and activation with KOH at 850° C. are shown in FIG. 4A. The (002) planes of graphite correspond to broad patterns ranging from 2θ=12° to 2θ=30°, with a peak at 2θ=24°, indicating that the material was amorphous. A broad peak in XRD indicates that the material is amorphous, whereas a sharp peak denotes its crystalline nature. The XRD pattern of the DSAC 208 also revealed a weak (101) peak with a 2-theta value at 44° caused by alpha-axis of the graphite structure.

Figure 4B:
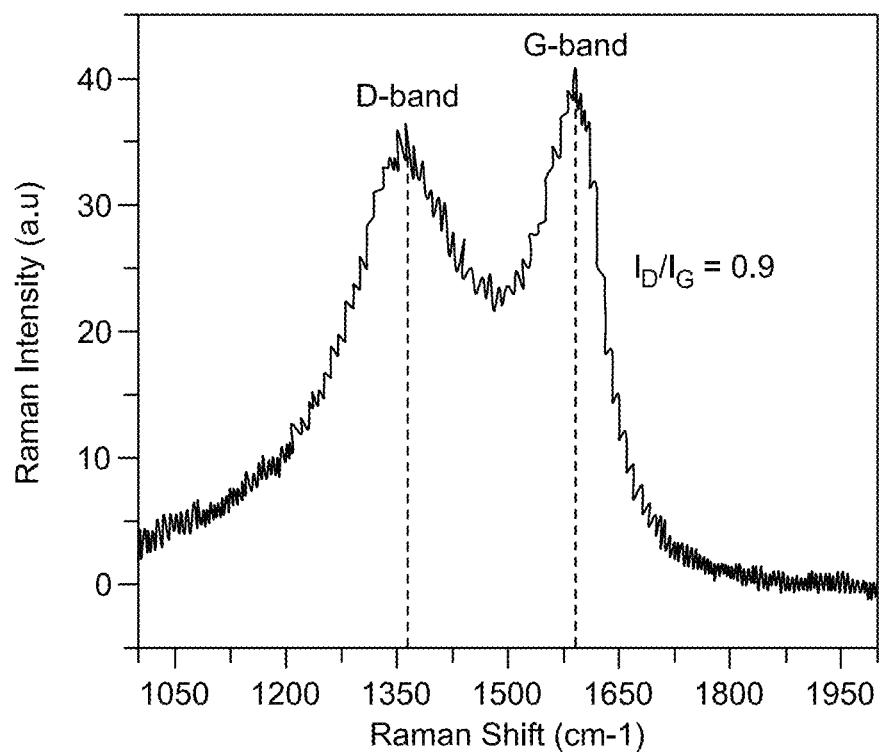
FIG. 4B is a plot depicting a Raman spectra of the DSAC, according to certain embodiments.

Raman spectroscopy was used to determine the structure of carbonaceous materials, especially their graphitic and defective nature. The Raman spectra of the DSAC 208 exhibit two distinct peaks (FIG. 4B). The graphitic nature of the substance is represented by the G-band (at about 1600 cm$^{-1}$) and is connected to the $E_{2g}$ vibrational mode of C—C(sp$^2$) bond stretching. On the other hand, an imperfect carbon structure with an $A_{1g}$ vibrational mode is connected to the D-band (at about 1340 cm$^{-1}$). The D-band is related to flaws, and its intensity increases as the number of defects increases. The $I_D/I_G$ ratio provides information regarding the defects in carbonaceous material, with a high ratio indicating more defects in the carbon. The measured $I_D/I_G$ ratio of the DSAC 208 was 0.9. This low ratio indicates that the activated carbon is mainly graphitic in nature.

Figure 4C:
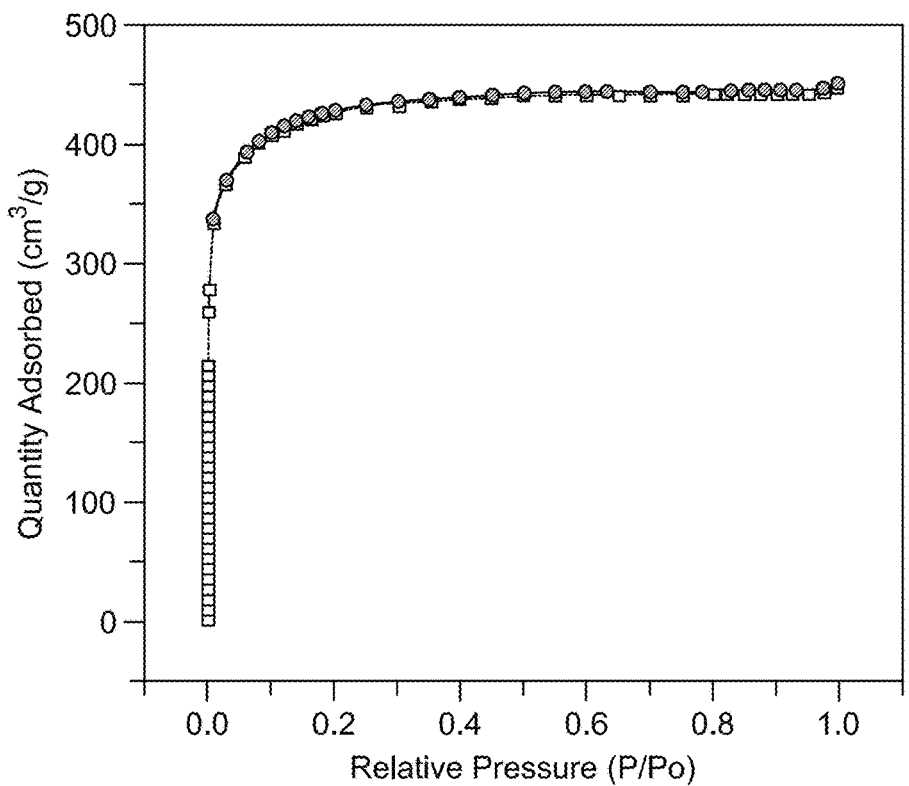
FIG. 4C is a plot depicting nitrogen adsorption/desorption isotherms of the DSAC, according to certain embodiments.
Figure 4D:
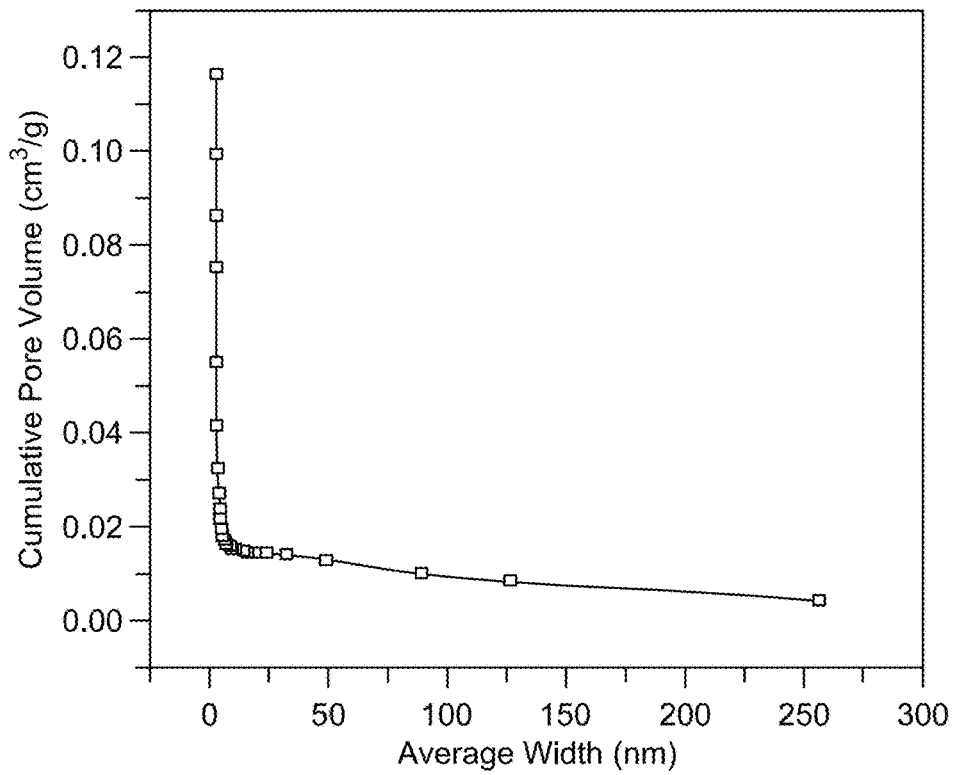
FIG. 4D is a plot depicting Barrett-Joyner-Halenda (BJH) pore size distribution of the DSAC, according to certain embodiments.
Figure 4E:
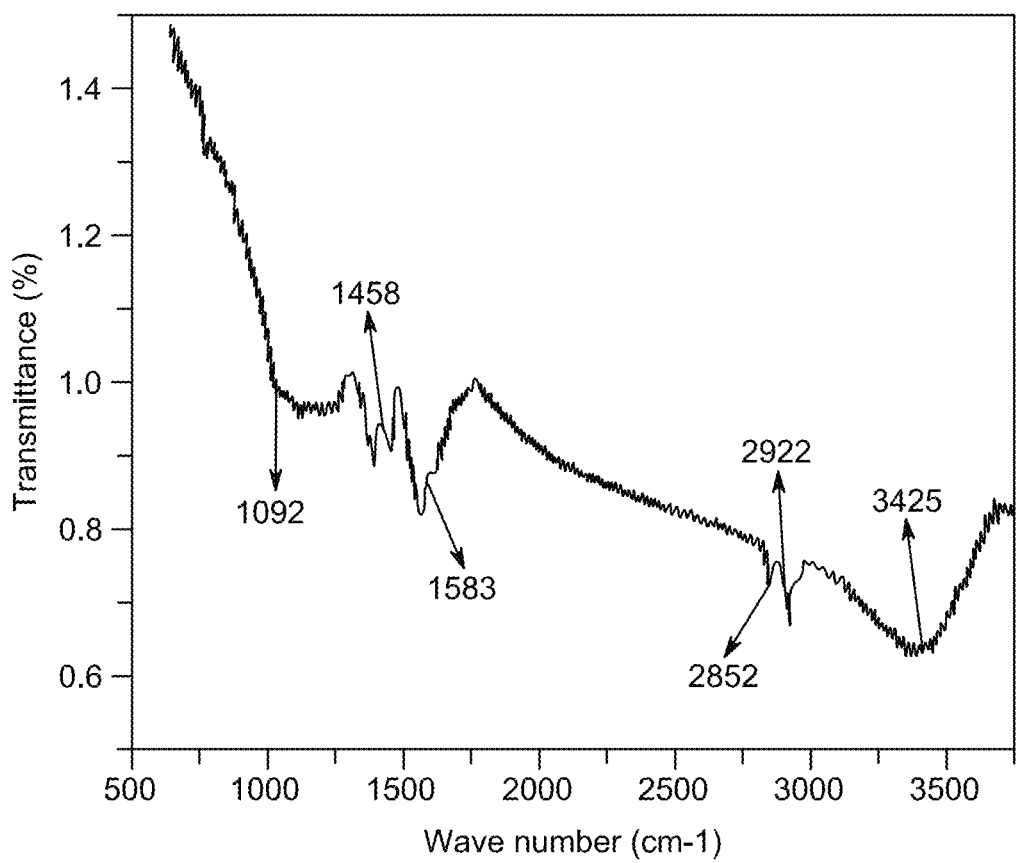
FIG. 4E is Fourier transform infrared (FT-IR) spectra of the DSAC, according to certain embodiments.

FIG. 4C and FIG. 4D display $N_2$ adsorption/desorption isotherms and pore size distribution patterns of the DSAC 208. According to the present disclosure, the BET surface area and the pore volume of the DSAC 208 were 1612 m$^2$/g and 0.692 cm$^2$/g, respectively. The BET curve exhibited a type I-like isotherm, which is typical of microporous materials with pore dimensions less than 2 nm. The activated carbon exhibits mesopore and macropore, as determined by the Barrett-Joyner-Halenda (BJH) pore size distribution analysis. These larger pores can enhance the transport of electrolyte ions through the carbon matrix, which is favorable for electrochemical energy storage applications. The presence of micropores, which dominate the high surface area of the date stone activated carbon, is also advantageous as it provides additional sites for electrolyte ion adsorption. As a result, the synergistic combination of micropores, mesopores, and macropores in activated carbon offers a favorable balance of the surface area and ion transport properties that are well-suited for electrochemical energy storage applications.

Figure 5A:
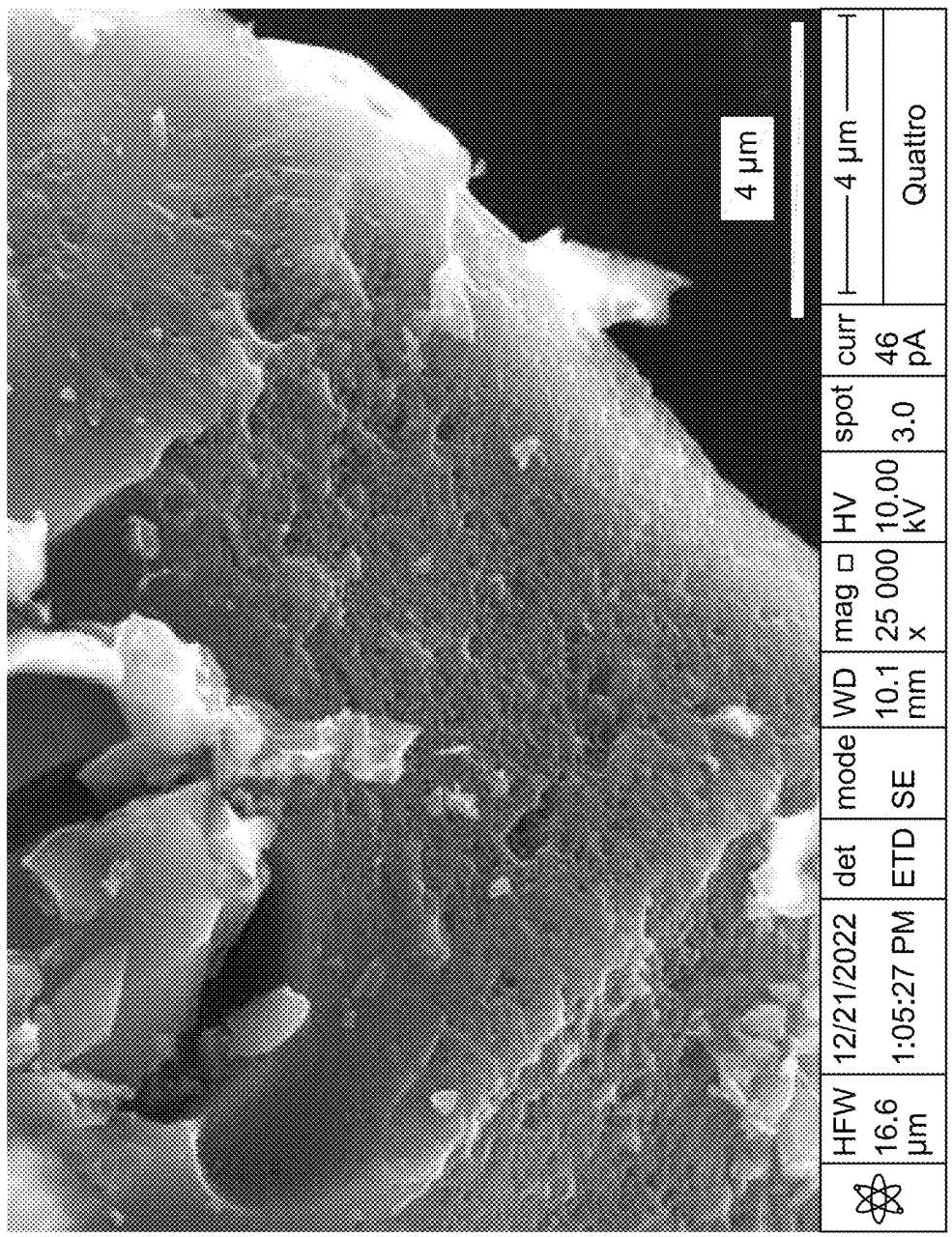
FIG. 5A is a field emission scanning electron microscopy (FE-SEM) image of the DSAC at 4 micrometers (μm), according to certain embodiments.
Figure 5B:
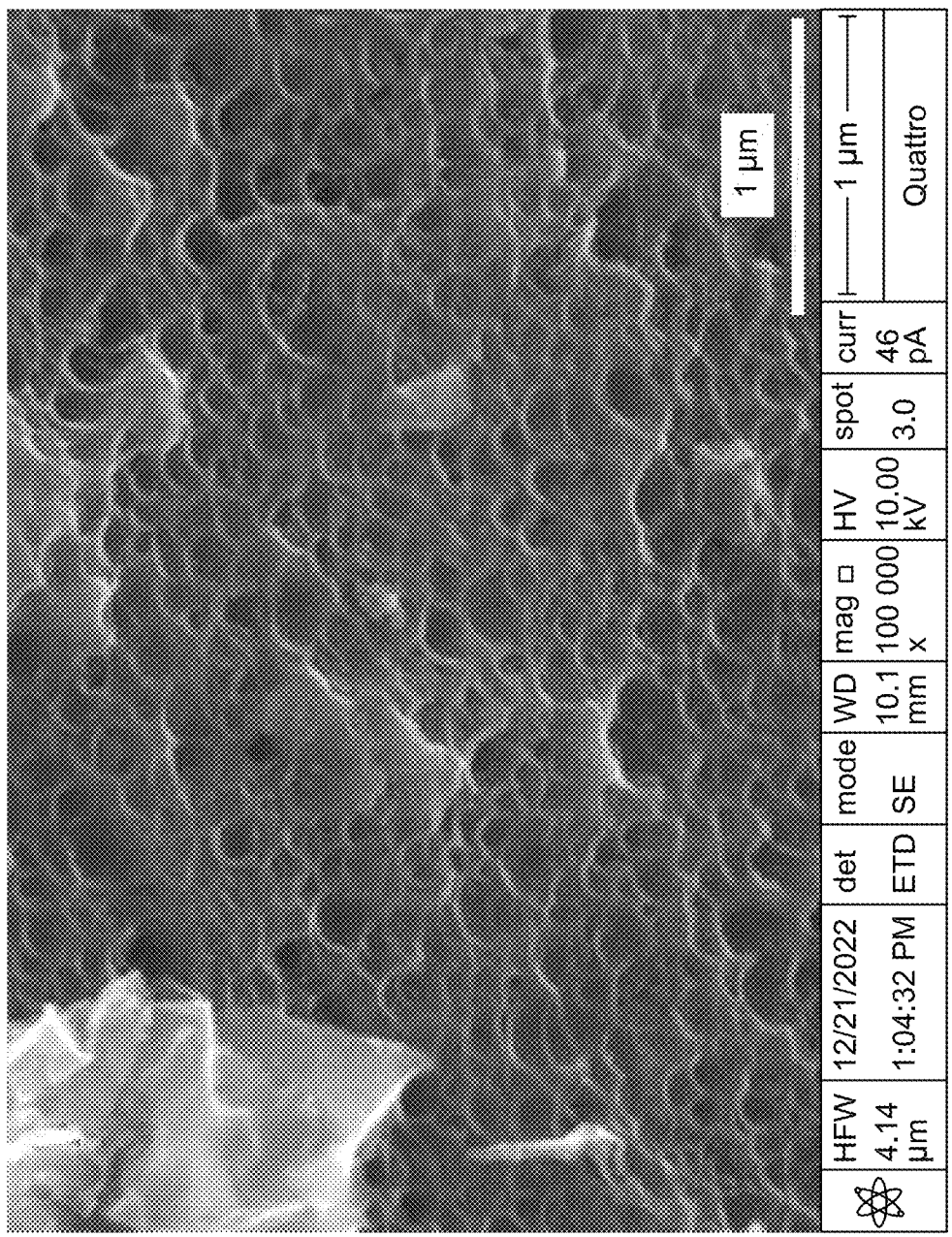
FIG. 5B is a FE-SEM image of the DSAC at 1 μm, according to certain embodiments.
Figure 5C:
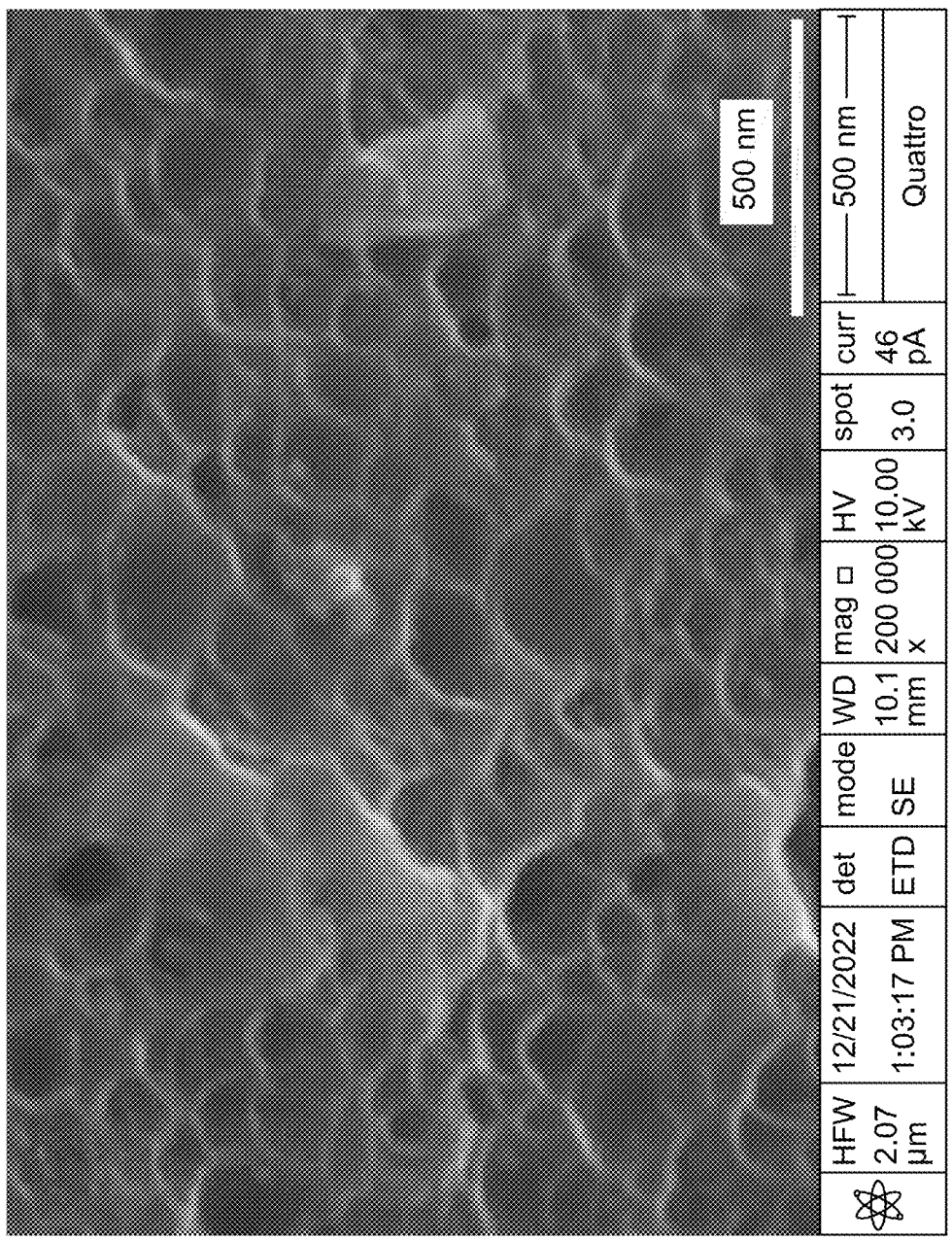
FIG. 5C is a FE-SEM image of the DSAC at 500 nanometers (nm), according to certain embodiments.
Figure 5D:
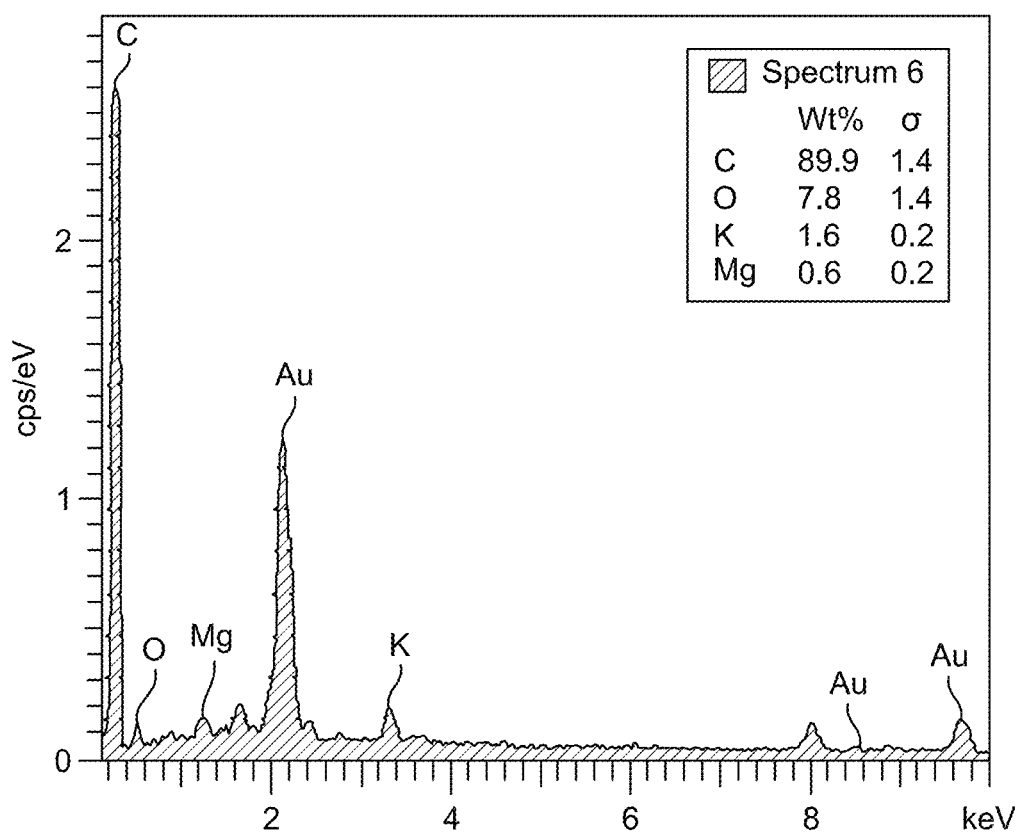
FIG. 5D is an energy dispersive X-Ray (EDX) spectra of the DSAC, according to certain embodiments.
Figure 5E:
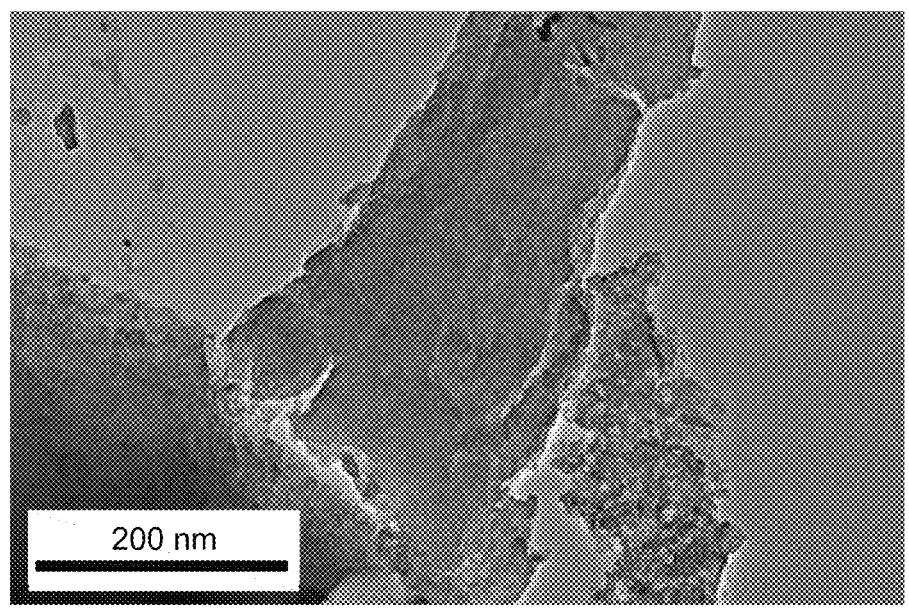
FIG. 5E is a transmission electron microscopy (TEM) image of the DSAC at 200 nm, according to certain embodiments.
Figure 5F:
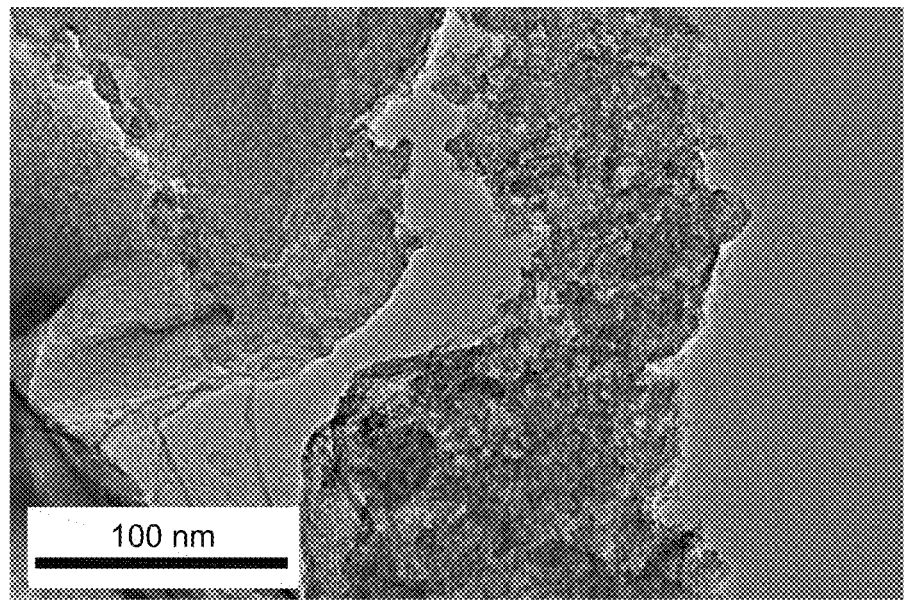
FIG. 5F is a TEM image of the DSAC at 100 nm, according to certain embodiments.
Figure 5G:
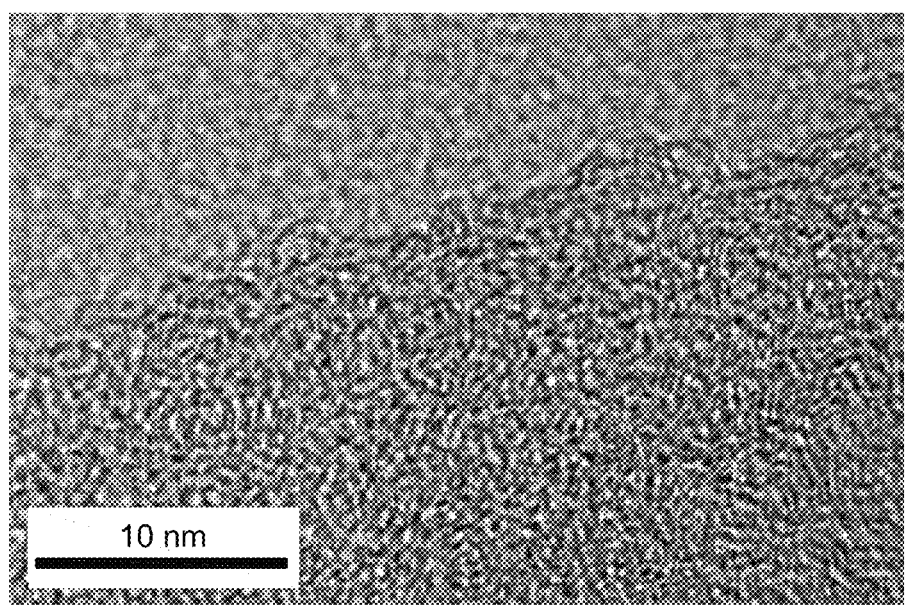
FIG. 5G is a high-resolution transmission electron microscopy (HRTEM) of the DSAC, according to certain embodiments.
Figure 5H:
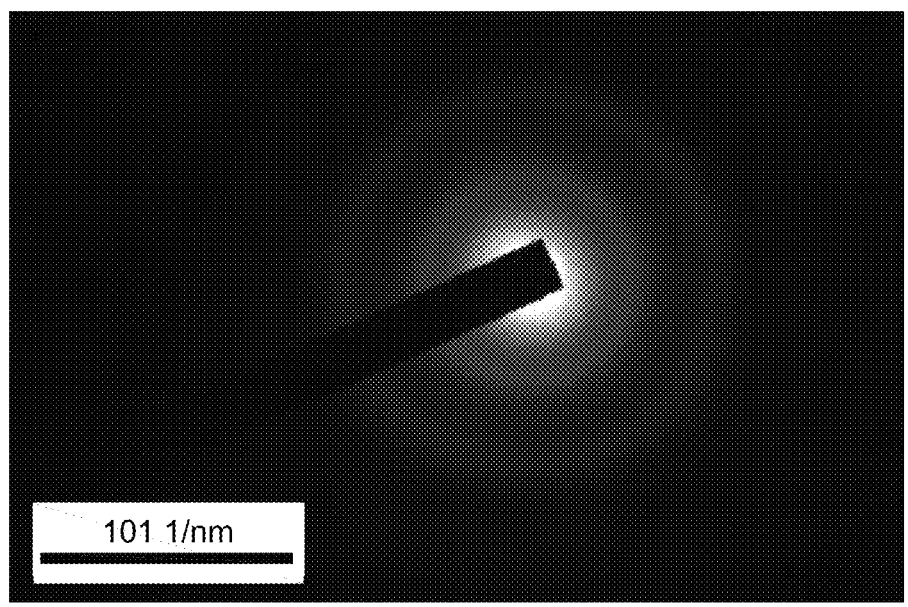
FIG. 5H is a selected area electron diffraction (SAED) image of the DSAC, according to certain embodiments.

FIGS. 5A-5C show field emission scanning electron microscopy (FE-SEM) images of the DSAC 208 at different magnifications. FIG. 5D shows the corresponding energy-dispersive X-ray spectroscopy (EDS) elemental analysis. FIGS. 5A-5C show that the activated carbon sample has a nanosheet-type morphology, with the sheets stacked on top of each other to form a hierarchical 3-dimensional structure. The elemental composition of the activated carbon was mainly carbon and oxygen, with trace amounts of potassium and magnesium. A copper substrate and gold coating caused Cu and Au peaks during the analysis.

Transmission electron microscopy (TEM) spectra of the DSAC 208 at different magnifications are shown in FIGS. 5E-5H. As observed from FIGS. 5E and 5F, the DSAC 208 exhibits a nanosheet-type morphology. High resolution transmission electron microscopy (HR-TEM) (FIG. 5G), and selected area electron diffraction (SAED) (FIG. 5H) results indicate that no lattice fringes were observed, confirming the amorphous nature of the material. These findings are consistent with the XRD analysis results.

Example 8: Electrochemical Characterization

Figure 6A:
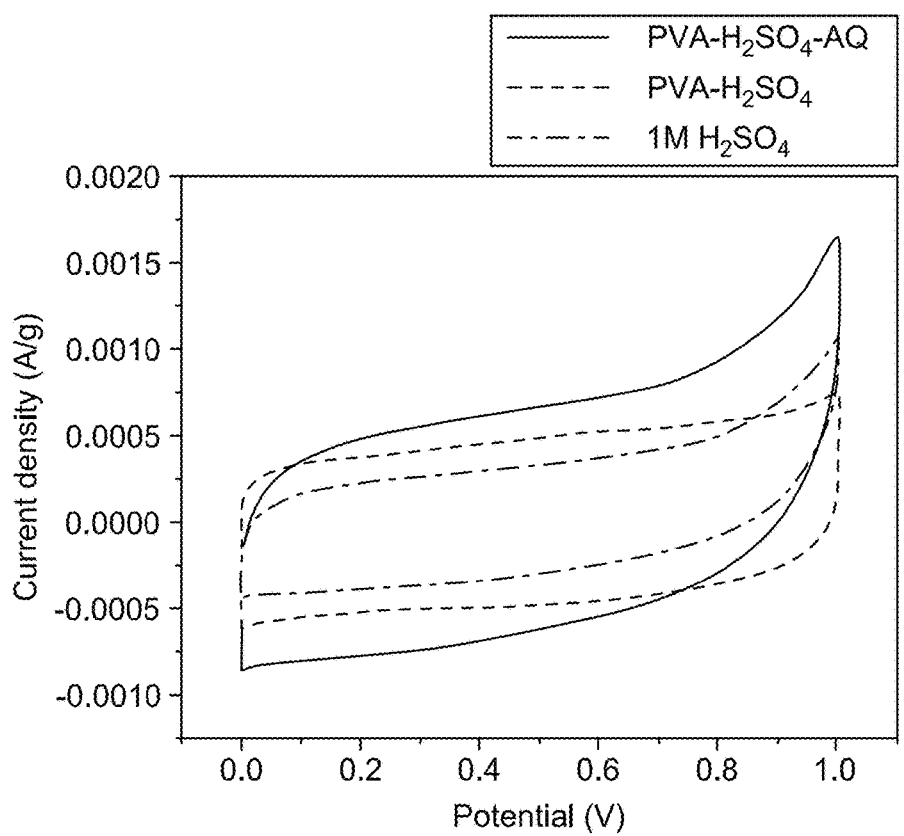
FIG. 6A is a cyclic voltammetry (CV) plot of a SSC device in different electrolytes at scan rate of 10 mV/s, according to certain embodiments.

Cyclic voltammetry (CV) was used to characterize the electrochemical properties of the SSC device. FIG. 6A displays the CV curves of the device using 1M $H_2SO_4$, PVA-$H_2SO_4$, and PVA-$H_2SO_4$-AQ gel-polymer electrolytes over a potential range of 0 to 1.0 V at a constant scan rate of 10 mV/s. The CV curves in all the electrolytes have a rectangular form, indicating an electric double layer capacitor (EDLC), which stores electrochemical energy by building up electrolyte ions at the electrode/electrolyte interface. However, the curve in PVA-$H_2SO_4$-AQ electrolyte exhibits a larger area, indicating that the electrolyte has a higher specific capacitance. At a scan rate of 10 mV/s, the specific capacitance calculated from the curves for the 1M $H_2SO_4$, PVA-$H_2SO_4$, and PVA-$H_2SO_4$-AQ gel-polymer electrolytes was 96, 130, and 185 F/g, respectively. This increased capacitance is attributed to the redox nature of the AQ (i.e., anthraquinone/9,10-dihydroxyanthracene redox couple) in the case of PVA-$H_2SO_4$-AQ, as shown in FIG. 7.

Figure 6B:
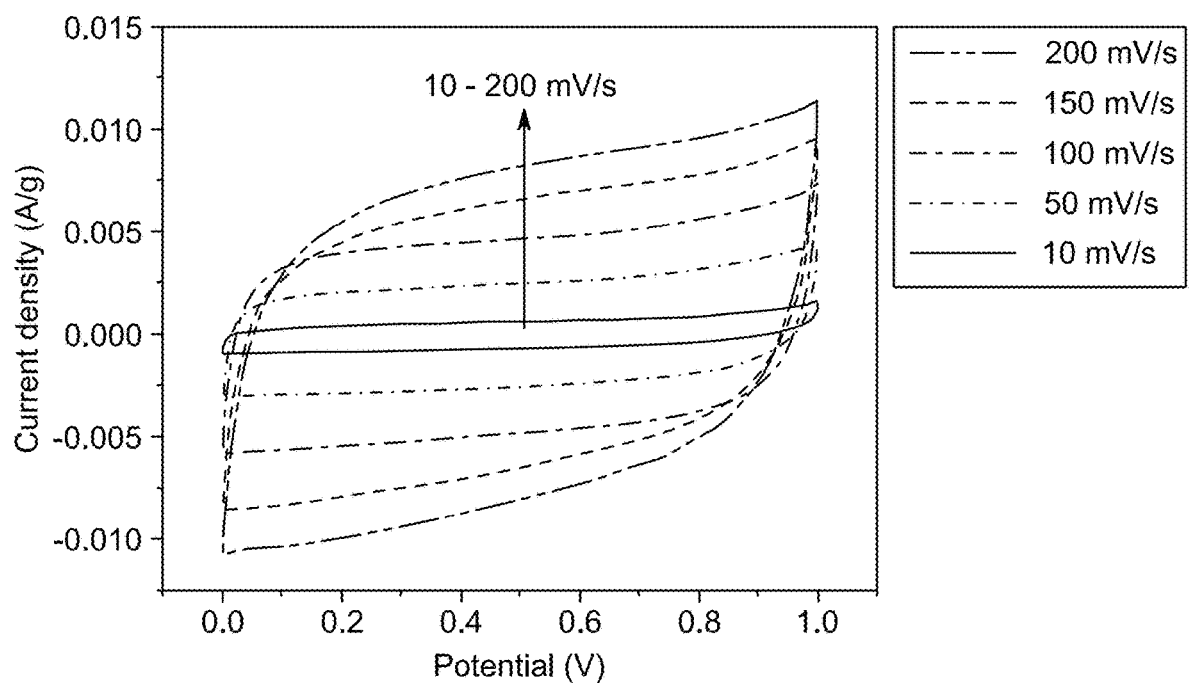
FIG. 6B is a CV plot of the SSC device using a polyvinyl alcohol/sulfuric acid/anthraquinone (PVA-$H_2SO_4$-AQ) gel electrolyte at different scan rates ranging from 10 to 200 mV/s, according to certain embodiments.

The redox process becomes clear when the performance of a supercapacitor 100 containing 1M $H_2SO_4$ aqueous or PVA-$H_2SO_4$ gel-polymer electrolyte without the anthraquinone was compared. It can be concluded that the total capacitance of the supercapacitor 100 with PVA-$H_2SO_4$-AQ gel electrolyte is the synergistic sum of the EDLC and the pseudocapacitance generated by the reversible redox reaction of anthraquinone at the electrode/electrolyte interface. FIG. 6B depicts the CV curves of the SSC device using PVA-$H_2SO_4$-AQ gel electrolyte at various scan rates ranging from 10 to 200 mV/s. The values of the specific capacitance calculated from the CV curves are 185, 140, 131, 116, and 107 F/g at 10, 50, 100, 150, and 200 mV/s, respectively. As usual, increasing the scan rate leads to a decrease in the specific capacitance. This is because the electrolyte ions have enough time to diffuse into the porous network of the activated carbon at low scan rates.

Figure 6C:
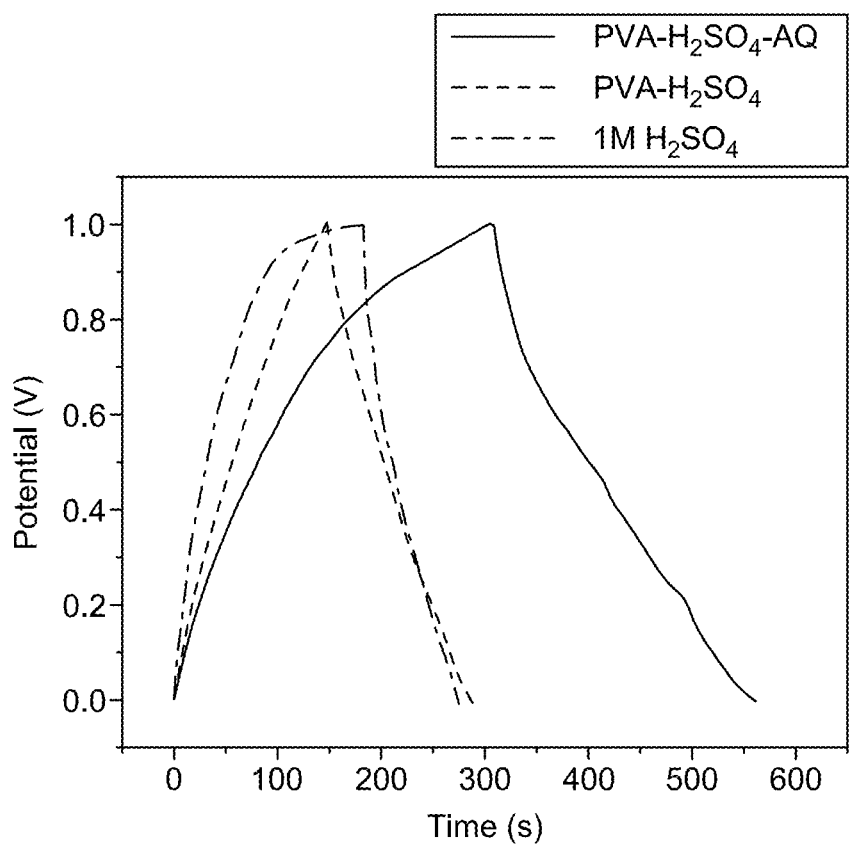
FIG. 6C is a schematic plot depicting comparison of galvanostatic charge-discharge cycle (GCD) curves of the SSC device in different electrolytes at a fixed current density of 0.5 A/g, according to certain embodiments.
Figure 6D:
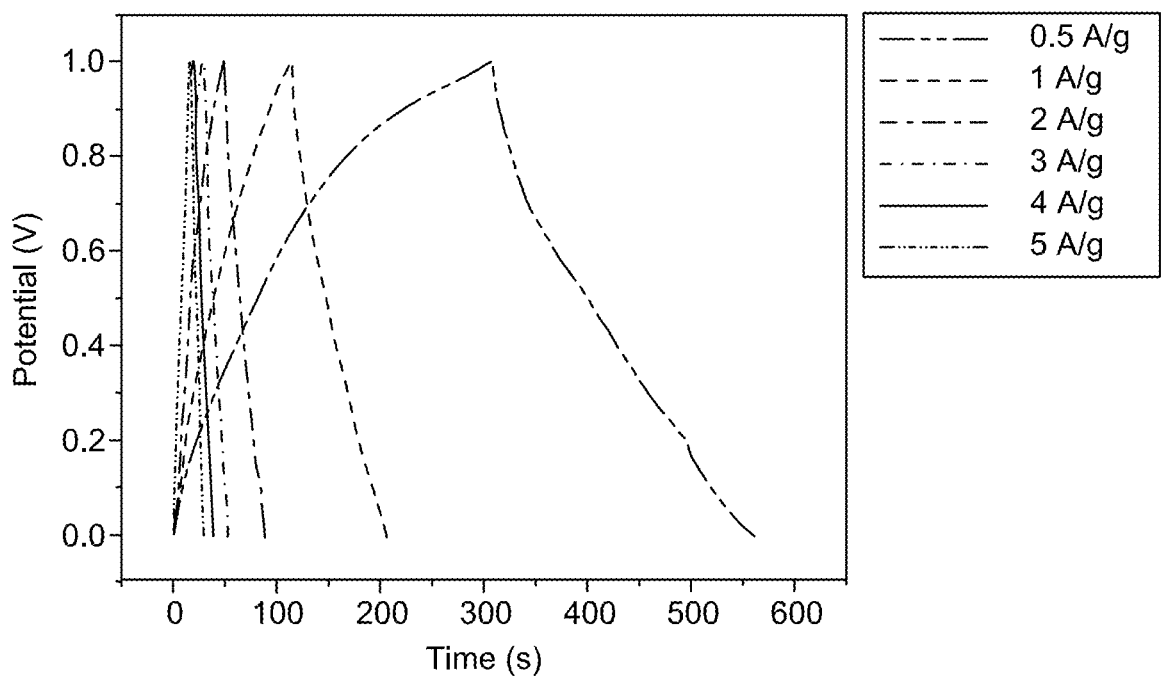
FIG. 6D is a schematic plot depicting GCD curves of the SSC device using the PVA-$H_2SO_4$-AQ gel electrolyte at different current densities, according to certain embodiments.
Figure 8A:
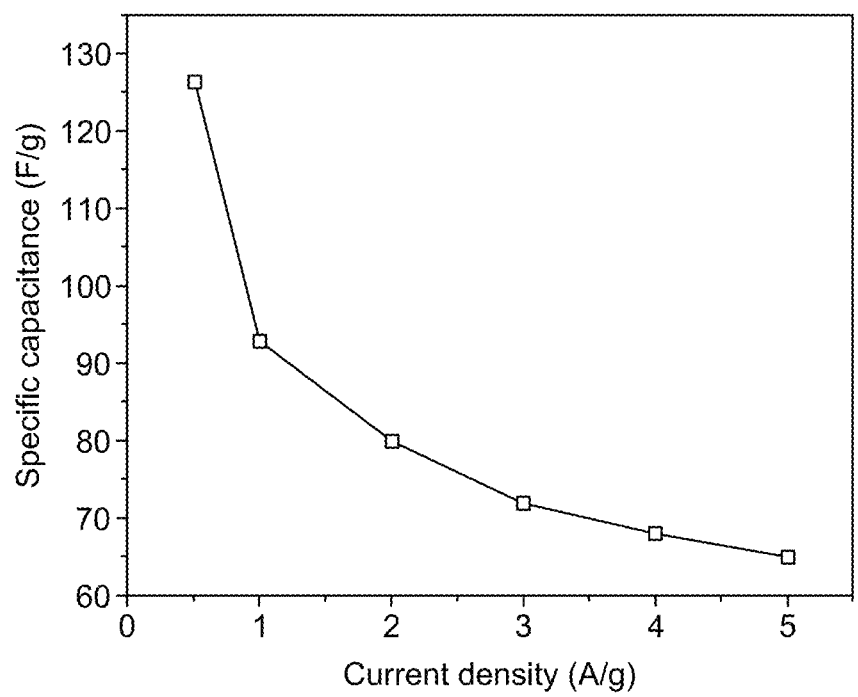
FIG. 8A is a plot depicting capacitance of the SSC device in different electrolytes at different current densities, according to certain embodiments.

FIG. 6C compares the galvanostatic charge-discharge cycle (GCD) curves of the SSC device in various electrolytes at a given current density of 0.5 A/g. FIG. 6D shows the GCD curves for the SSC device using PVA-$H_2SO_4$-AQ gel electrolyte at various current densities ranging from 0.5 to 5 A/g. Equation (1) was used to calculate the capacitance of the SSC device at various current densities, and FIG. 8A shows the result. Consistent with the CV data, the supercapacitor 100 with the PVA-$H_2SO_4$-AQ gel electrolyte has a higher capacitance (i.e., longer discharge time) than PVA-$H_2SO_4$ and 1M $H_2SO_4$ electrolytes at the same current densities. The specific capacitance of the supercapacitor with PVA-$H_2SO_4$-AQ was 126.5 F/g, which is substantially greater than that obtained with PVA-$H_2SO_4$ (72.5 F/g) and 1M $H_2SO_4$ (47 F/g) at 0.5 A/g current density. This increased capacitance could be due to the addition of the previously indicated rapid reversible redox mechanism of AQ.

Figure 8B:
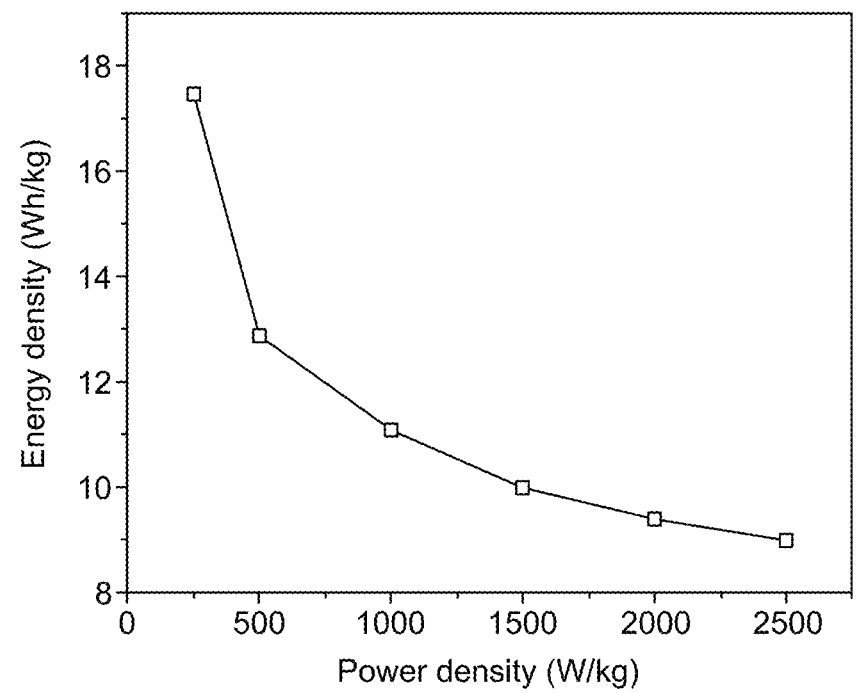
FIG. 8B is a Ragone plot of the SSC device using different electrolytes, according to certain embodiments.
Figure 8C:
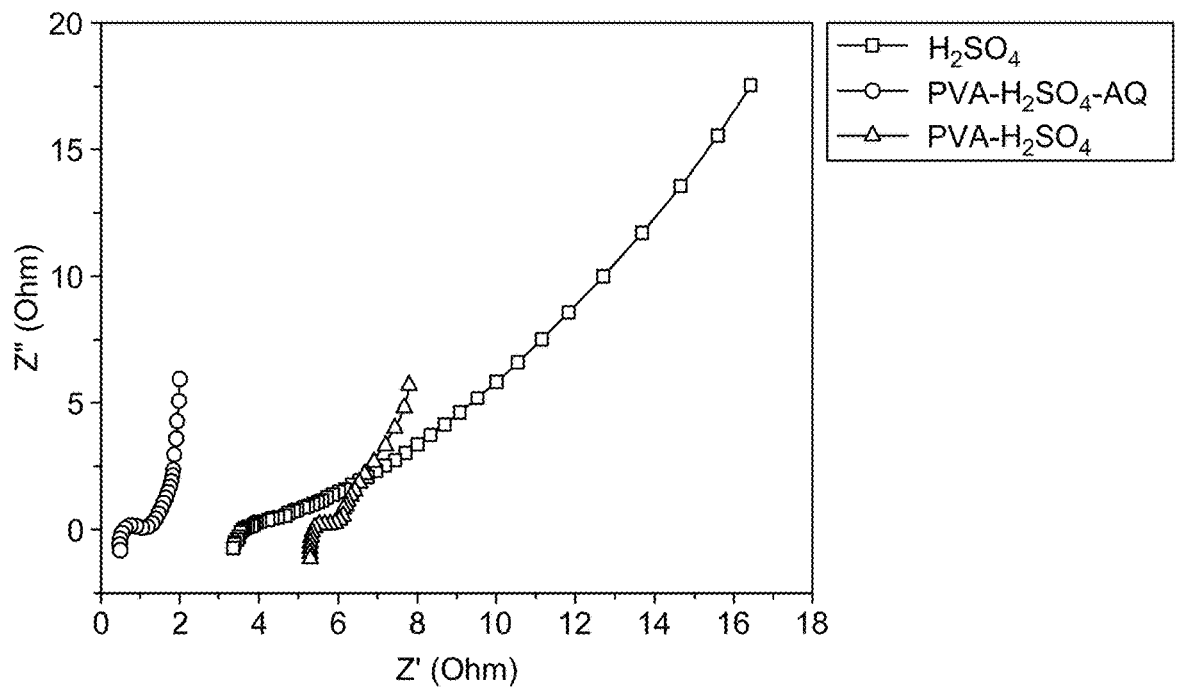
FIG. 8C is a Nyquist plot of the SSC device in different electrolytes, according to certain embodiments.
Figure 8D:
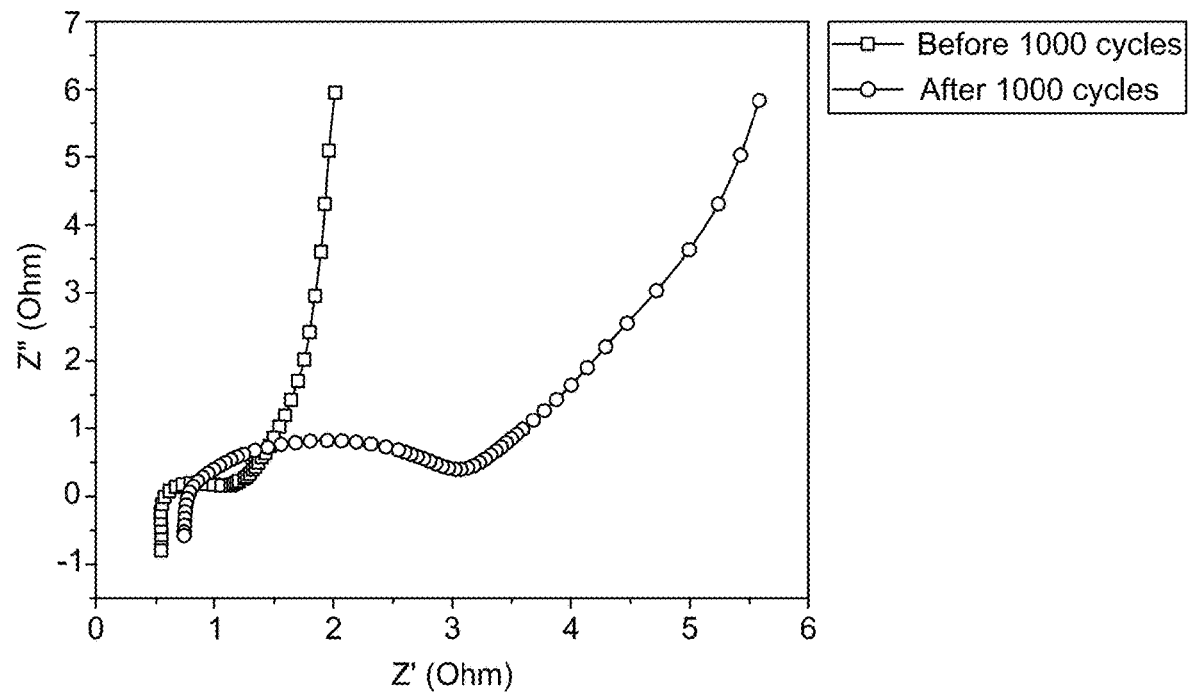
FIG. 8D is a Nyquist plot of the SSC device before and after stability test, according to certain embodiments.

Equations (2 and 3) were used to determine the energy and power densities of the SSC device. FIG. 8B depicts the E against P graphs (Ragone plots) of the SSC device. As per the plot, the supercapacitor 100 exhibits the expected behavior, where an increase in power density leads to a reduction in energy density. FIG. 8C displays the Nyquist plot obtained from the electrochemical impedance spectroscopy (EIS) measurements of the SSC device using various electrolytes. The electrolyte resistance Rb is indicated by the first intercept on the real axis in the high-frequency region, whereas the interfacial resistance is associated with the semicircle. The equivalent series resistance (RESR) values of the SCC 100 using $H_2SO_4$, PVA-$H_2SO_4$, and PVA-$H_2SO_4$-AQ gel electrolyte systems were found to be 3.3, 5.3, and 0.5Ω, respectively. The SSC device based on the PVA-$H_2SO_4$-AQ gel electrolyte has much lower charge transfer resistance, solution resistance, and diffusion resistance than the devices based on the other two electrolytes.

FIGS. 9A-9D depict the Nyquist plot of the PVA-$H_2SO_4$-AQ gel electrolyte-fabricated device before and after the stability test. According to the plot, there is no significant change in RESR. There is a significant increase in charge transfer resistance of the fabricated SSC 100 and can be attributed to the degradation of the electrode 104 due to the high current applied during the stability test. This shows that the fabricated SSC device exhibits robust performance.

Numerous modifications and variations of the present disclosure are possible in light of the above teachings. It is therefore to be understood that within the scope of the appended claims, the invention may be practiced otherwise than as specifically described herein.

The invention claimed is:

1. A supercapacitor, comprising:
   a gel electrolyte; and
   two electrodes;
   wherein the electrodes comprise:
   a substrate;
   date stone activated carbon;
   a conductive carbon compound different from the date stone activated carbon; and
   a binding compound,
   wherein a mixture of the date stone activated carbon, the conductive carbon compound, and the binding compound at least partially coats a surface of the substrate,
   wherein the two electrodes are assembled in a symmetrical layered configuration with the surfaces coated with the mixture facing each other,
   wherein the gel electrolyte is present between the surfaces coated with the mixture to form the supercapacitor,
   wherein the gel electrolyte is a mixture of $H_2SO_4$, polyvinyl alcohol, and anthraquinone,
   wherein particles of the date stone activated carbon have a nanosheet morphology, and
   wherein the nanosheets are stacked on top of each other to form a hierarchical structure.

2. The supercapacitor of claim 1, wherein the date stone activated carbon is at least 70% graphitic.

3. The supercapacitor of claim 1, wherein the nanosheets have a width of 100-500 nm.

4. The supercapacitor of claim 1, wherein the date stone activated carbon comprises carbon, oxygen, potassium, and magnesium.

5. The supercapacitor of claim 1, wherein the date stone activated carbon comprises 80-95 wt. % carbon, 1-15 wt. % oxygen, 1-5 wt. % potassium, and 0.1-2 wt. % magnesium, based on a total weight of the date stone activated carbon.

6. The supercapacitor of claim 1, wherein the date stone activated carbon has a BET surface area of 1500-1700 m²/g.

7. The supercapacitor of claim 1, wherein the date stone activated carbon has a pore volume of 0.6-0.8 cm²/g.

8. The supercapacitor of claim 1, wherein the date stone activated carbon has micropores, mesopores, and macropores.

9. The supercapacitor of claim 1, wherein the mixture comprises 65-85 wt. % of the date stone activated carbon, 5-25 wt. % of the conductive carbon compound, and 5-15 wt. % of the binding compound, based on a total weight of the mixture.

10. The supercapacitor of claim 1, wherein the gel electrolyte comprises 1-20 wt. % polyvinyl alcohol and 80-99 wt. % anthraquinone, based on a total weight of the polyvinyl alcohol and the anthraquinone in the gel electrolyte.

11. The supercapacitor of claim 1, wherein the gel electrolyte has an equivalent series resistance of 0.3-0.7 Ω.

12. The supercapacitor of claim 1, wherein the substrate is made from at least one material selected from the group consisting of stainless steel, aluminum, nickel, copper, platinum, zinc, tungsten, and titanium.

13. The supercapacitor of claim 1, wherein the conductive carbon compound is at least one selected from the group consisting of graphite, activated carbon, reduced graphene oxide, carbon nanotubes, carbon nanofibers, and carbon black.

14. The supercapacitor of claim 1, wherein the binding compound is selected from the group consisting of polyvinylidene fluoride and N-methyl pyrrolidone.

15. The supercapacitor of claim 1, having a specific capacitance of 120-150 F/g at 0.5 A/g.

16. The supercapacitor of claim 1, having an energy density of 15-20 Wh/kg at a power density of 250 W/kg.

17. The supercapacitor of claim 1, having a capacitance retention of at least 85% after 1000 charge-discharge cycles.

18. A power bank, comprising:
   2-10 of the supercapacitors of claim 1 connected in parallel and/or series.

19. A wearable device comprising the supercapacitor of claim 1, wherein:
   the supercapacitor is electrically connected to a sensor; and
   the supercapacitor functions as a battery.

20. The supercapacitor of claim 1, wherein the date stone activated carbon is produced by a method comprising:
   cleaning and drying date stones to form dry date stones;
   pulverizing the dry date stones to form a powder;
   carbonizing the powder at a temperature of 300-500° C. for 1-10 hours under an inert atmosphere to form a carbon powder;
   mixing the carbon powder with a base to form a carbon solution; and
   carbonizing the carbon solution at a temperature of 700-1,000° C. for 1-10 hours under an inert atmosphere to form the date stone activated carbon.

\* \* \* \* \*